United States Patent
Yan et al.

(10) Patent No.: US 12,033,267 B2
(45) Date of Patent: Jul. 9, 2024

(54) SCENE UPDATE CONTROL METHOD AND APPARATUS, ELECTRONIC DEVICE, AND STORAGE MEDIUM

(71) Applicant: TENCENT TECHNOLOGY (SHENZHEN) COMPANY LIMITED, Guangdong (CN)

(72) Inventors: Runfa Yan, Shenzhen (CN); Jie Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 427 days.

(21) Appl. No.: 17/501,633

(22) Filed: Oct. 14, 2021

(65) Prior Publication Data

US 2022/0032189 A1 Feb. 3, 2022

Related U.S. Application Data

(63) Continuation-in-part of application No. PCT/CN2020/120064, filed on Oct. 10, 2020.

(30) Foreign Application Priority Data

Dec. 5, 2019 (CN) .......................... 201911236522.0

(51) Int. Cl.
*G06T 15/08* (2011.01)
*G06F 3/06* (2006.01)
(Continued)

(52) U.S. Cl.
CPC ............ *G06T 15/08* (2013.01); *G06F 3/0656* (2013.01); *G06T 1/60* (2013.01); *G06T 17/00* (2013.01); *G06T 2200/04* (2013.01)

(58) Field of Classification Search
None
See application file for complete search history.

(56) References Cited

U.S. PATENT DOCUMENTS

2014/0327690 A1 11/2014 McGuire et al.

FOREIGN PATENT DOCUMENTS

| CN | 109701273 A | 5/2019 |
|---|---|---|
| CN | 109978838 A | 7/2019 |

(Continued)

OTHER PUBLICATIONS

Kim et al.; "Binary volume rendering using Slice-based Binary Shell," Jun. 2001; Visual Comp 17, pp. 243-257; https://doi.org/10.1007/s003710100108 (Year: 2001).*

(Continued)

*Primary Examiner* — Peter Hoang
(74) *Attorney, Agent, or Firm* — Sughrue Mion, PLLC

(57) ABSTRACT

A scene update control method and apparatus, an electronic device, and a storage medium are provided. A scene is divided into a plurality of region blocks, each region block including a plurality of position coordinate pairs. A voxel file of a region block includes all voxels on the region block, and voxel files of the plurality of region blocks are stored on a magnetic disk according to an order in which the plurality of region blocks are to be updated in the scene. The voxel files of the plurality of region blocks are read from the magnetic disk and stored to a memory in advance. The scene is updated based on the voxel files of the plurality of region blocks from the memory.

20 Claims, 8 Drawing Sheets

(51) Int. Cl.
    *G06T 1/60*         (2006.01)
    *G06T 17/00*       (2006.01)

(56) References Cited

FOREIGN PATENT DOCUMENTS

| CN | 110368694 A | 10/2019 |
|----|-------------|---------|
| CN | 110531940 A | 12/2019 |
| CN | 111068313 A | 4/2020  |

OTHER PUBLICATIONS

Arnebäck et al. "Bloxel—Developing a voxel game engine in Java using OpenGL;" 2015; Chalmers University of Gothenburg; pp. 1-48 (Year: 2015).*

Chinese First Office Action issued in CN 201911236522.0 dated Sep. 3, 2020.

Chinese Second Office Action issued in CN 201911236522.0 dated Oct. 27, 2020.

International Search Report for PCT/CN2020/120064 dated Jan. 12, 2021 (PCT/ISA/210).

Written Opinion for PCT/CN2020/120064 dated Jan. 12, 2021 (PCT/ISA/237).

* cited by examiner

SCENE UPDATE CONTROL METHOD AND APPARATUS, ELECTRONIC DEVICE, AND STORAGE MEDIUM

CROSS-REFERENCE TO RELATED APPLICATION(S)

This application is a continuation application of International Application No. PCT/CN2020/120064, filed Oct. 10, 2020, which claims priority to Chinese Patent Application No. 201911236522.0, filed with the China National Intellectual Property Administration on Dec. 5, 2019, the disclosures of which are incorporated by reference in their entireties.

FIELD

The disclosure relates to the field of computer technologies, and in particular, to game data processing, and provides a scene update control method and apparatus, an electronic device, and a storage medium.

BACKGROUND

To meet a demand for high game quality, games have entered a three-dimensional (3D) era. The gameplay of 3D games is not limited to the ground, and further includes flying and fighting in the air, and the like.

At present, voxels are used in a 3D game to describe objects in scenes. A voxel is a minimum expression unit in a 3D space, and is similar to a pixel in a three-dimensional (2D) space. At present, in existing conventional technologies, during running of a game, voxels and indexes corresponding to an entire scene need to be consecutively stored in a memory. However, too much memory is occupied if all the voxels and indexes are stored. In addition, memory requested by a game application program is limited. Consequently, all the voxels and indexes cannot be stored in the memory. Therefore, how to obtain a voxel file and store the voxel file in a memory to ensure the fluency of a game process is a technical problem that needs to be resolved.

SUMMARY

Embodiments of the disclosure provide a scene update control method and apparatus, an electronic device, and a storage medium, to read a voxel file from a magnetic disk and store the voxel file to memory requested by a game application program, thereby ensuring the fluency of a game process.

According to an aspect, an embodiment of the disclosure provides a scene update control method, performed by an electronic device, the method including:

reading, in a process of updating a scene including a plurality of region blocks, voxel files of region blocks from a magnetic disk and storing the voxel files into a memory, voxels on each region block forming a voxel file, wherein a plurality of voxel files of the plurality of region blocks are stored on the magnetic disk according to an order in which the plurality of region blocks in the scene are to be updated;

determining, according to a region block to be updated in the scene, a target voxel file corresponding to the region block to be updated; and obtaining voxels in the target voxel file from the memory, and updating the scene according to the obtained voxels.

According to another aspect, an embodiment of the disclosure provides a scene update control apparatus, including:

at least one memory configured to store program code; and at least one processor configured to read the program code and operate as instructed by the program code, the program code including:

reading code configured to cause the at least one processor to read, in a process of updating a scene including a plurality of region blocks, voxel files of region blocks from a magnetic disk and store the voxel files into a memory, voxels on each region block forming a voxel file, wherein a plurality of voxel files of the plurality of region blocks are stored on the magnetic disk according to an order in which the plurality of region blocks in the scene are to be updated;

determining code configured to cause the at least one processor to determine, according to a region block to be updated in the scene, a target voxel file corresponding to the region block to be updated; and update code configured to cause the at least one processor to obtain voxels in the target voxel file from the memory, and update the scene according to the obtained voxels.

According to another aspect, an embodiment of the disclosure provides an electronic device, including a storage and a processor, the storage being configured to store computer instructions, and the processor being configured to execute the computer instructions to implement the foregoing scene update control method.

According to another aspect, an embodiment of the disclosure provides a non-transitory computer-readable storage medium, storing computer instructions, the computer instructions, when executed by a processor, implementing the foregoing scene update control method.

According to another aspect, an embodiment of the disclosure provides a computer program product or a computer program, the computer program product or the computer program including computer instructions, the computer instructions being stored in a computer-readable storage medium. A processor of a computer device reads the computer instructions from the computer-readable storage medium and executes the computer instructions to cause the computer device to perform the foregoing scene update control method.

BRIEF DESCRIPTION OF THE DRAWINGS

To describe the technical solutions in the disclosure more clearly, the following briefly describes the accompanying drawings for describing the embodiments. The accompanying drawings in the following description show only some embodiments of the disclosure, and a person of ordinary skill in the art may still derive other accompanying drawings according to the accompanying drawings without creative efforts.

DETAILED DESCRIPTION

To make the objectives, technical solutions, and beneficial effects of the disclosure clearer, the following clearly and completely describes the technical solutions of the disclosure with reference to the accompanying drawings of the disclosure. The described embodiments are merely some rather than all of the embodiments of the disclosure. All other embodiments obtained by a person of ordinary skill in the art based on the embodiments of the disclosure without creative efforts shall fall within the protection scope of the disclosure.

Figure 1:
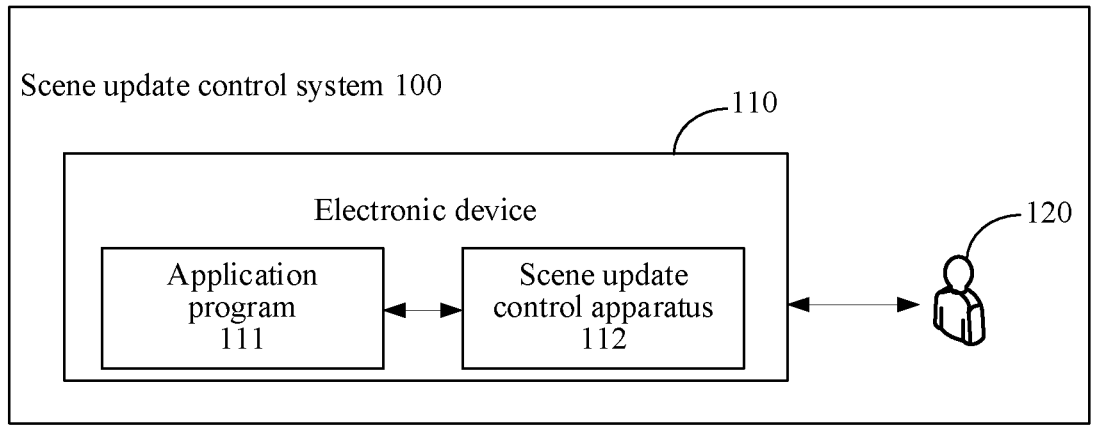
FIG. 1 is a structural diagram of a scene update control system according to an embodiment of the disclosure.

FIG. 1 is a structural diagram of a scene update control system according to an embodiment of the disclosure. As shown in FIG. 1, the scene update control system 100 includes an electronic device 100 and a user 120. An application program 111 is installed on the electronic device 100, and the electronic device 100 includes a scene update control apparatus 112. The application program 111 includes a plurality of scenes, and transmits an instruction to the scene update control apparatus 112 when receiving an operation instruction from the user, to update a scene.

Figure 2A:
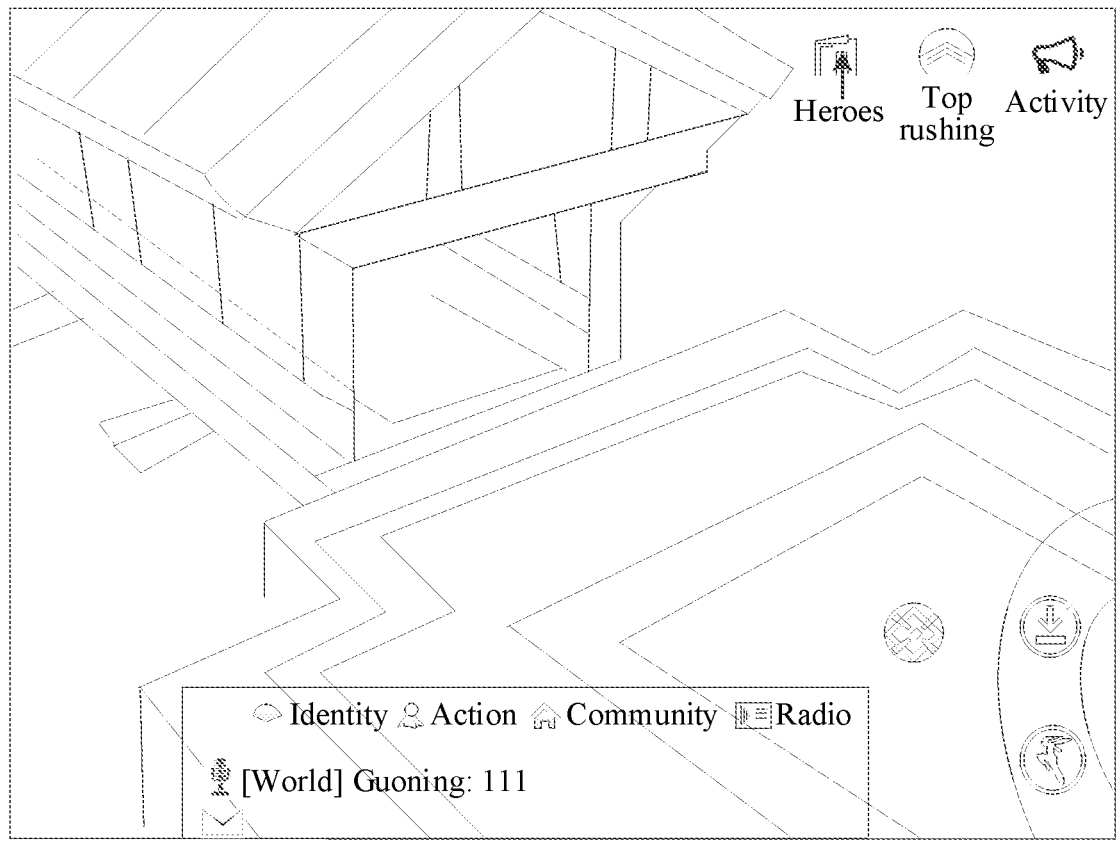
FIG. 2A is a schematic diagram of an example of a three-dimensional (3D) scene.
Figure 2B:
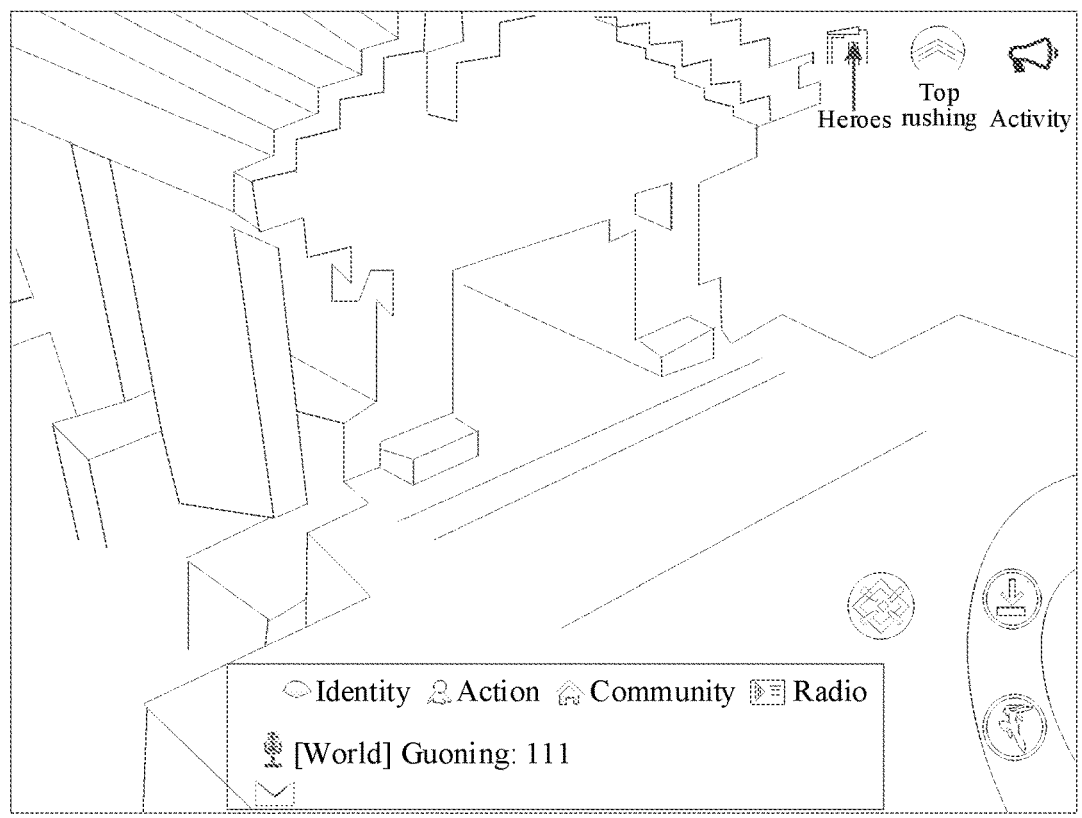
FIG. 2B is a schematic diagram of an example of voxelizing a 3D scene.

In an example embodiment, the application program 111 may be a game application program. Games have become an indispensable tool for entertainment, leisure, and communication in lives of users. As users have an increased demand for high game quality, games have entered a three-dimensional (3D) era. Objects in 3D scenes are constituted by voxels. A voxel is a minimum expression unit in a 3D space, and is represented by a small cuboid. Therefore, objects in 3D scenes are constituted by a plurality of small cuboids. FIG. 2A is a schematic diagram of a 3D scene. FIG. 2B is a schematic diagram of a voxelized scene corresponding to the 3D scene shown in FIG. 2A. A building in the scene is formed by combining a plurality of cubes.

A voxel is an abbreviation of a volume pixel, and a 3D object including a voxel may be presented by volumetric rendering or extracting an isosurface of a polygon with a given threshold contour. A voxel is a minimum unit of digital data in 3D space division, and the voxel is usually used for describing a 3D scene in fields such as 3D imaging and scientific data and medical imaging, as well as games.

Currently, a game application program is installed on an auxiliary storage of an electronic device, that is, data is stored in the auxiliary storage. For example, when a game application program is installed on an electronic device, all the data of the game application program is stored on a magnetic disk of the electronic device. A magnetic disk is an auxiliary storage, also referred to as an external storage, and is a storage other than a central processing unit (CPU) cache and a memory, configured to store temporarily unused programs and data, and exchange information with the memory; and store information for a long time without losing the information after power-off.

Data stored in the auxiliary storage cannot be used to implement a game function of the game application program. When a game is played, the data needs to be transferred to the memory, and the game application program reads the data in the memory to run the game. The memory is a bridge for communication between the external storage and the CPU, and is mainly used for storing instructions, data, caching, and the like of a system and application programs.

Figure 3:
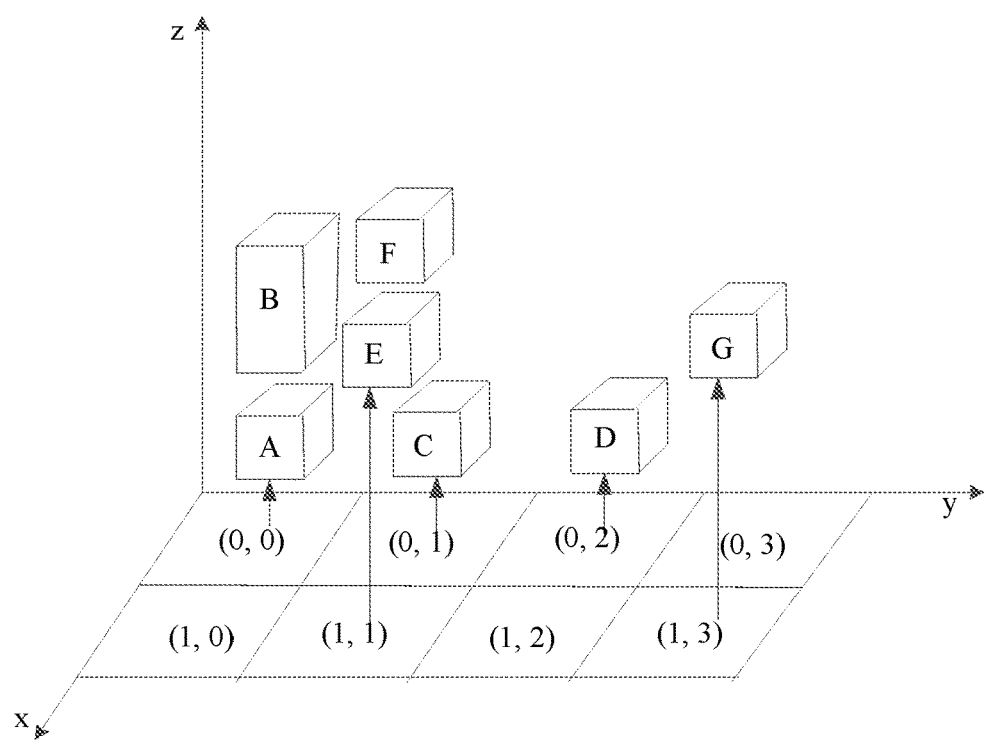
FIG. 3 is a schematic diagram of an example of voxelizing a 3D game.

For an ultra-large 3D scene, the scene is voxelized and stored on the magnetic disk. FIG. 3 is a schematic diagram of an example of voxelizing a 3D scene. The 3D scene is divided into a plurality of grids according to an upper surface or a lower surface of a voxel. The size of each grid is the same as the size of the upper surface or the lower surface of the voxel. Each grid represents a position coordinate pair. Objects at each position coordinate pair in the scene are voxelized. As shown in FIG. 3, both a cube A and a cube B at a position coordinate pair (0, 0) represent voxelized objects at the position coordinate pair (0, 0).

Currently, in the related art, when a voxelized scene is stored, indexes of position coordinate pairs and voxels at the position coordinate pairs are stored sequentially row by row or column by column, to generate index files and voxel files. When the game is played, the game application program needs to read the data from the memory and load the voxels at the position coordinate pairs in the scene. Therefore, all the voxel files and index files of the game application program stored on the magnetic disk need to be read into the memory, and are consecutively stored on the memory according to a storage manner in the magnetic disk, so that when the scene is loaded, an index subscript is determined according to a position coordinate pair, and a starting voxel at the position coordinate pair is found according to the index subscript.

Currently, voxels occupy relatively large memory. For example, for a 4 km*4 km scene with the granularity of 0.2 m, a quantity of voxels of the ground is about 20 K*20 K*2 bytes=800 M, where 2 bytes is the height of an upper surface of the ground. However, there are also voxels above the ground, for example, in the air. Therefore, the memory occupied by voxel files is greater than 800 M, and the memory occupied by the index files is 20 K*20 K*4 bytes=1600 M, the total memory occupied by the voxel file and the index file is 2400 M. For a mobile terminal, the size of a memory space thereof is generally 4 G, and the size of the memory allocated for game application programs is generally 1 G. However, the total memory occupied by games is much greater than the allocated memory. Therefore, all the voxels and indexes cannot be loaded into the memory. As a result, a scene cannot be updated for a target object on a mobile terminal side, which affects user experience.

According to the embodiments of the disclosure, the scene update control apparatus 112 divides a scene into a plurality of region blocks mainly by using a block division technology, each region block including a plurality of position coordinate pairs, an integer number of voxels existing at each position coordinate pair, so that each region block correspondingly stores a voxel file including all voxels on the region block, and stores the voxel files on the magnetic disk according to an order of updating the region blocks in the scene; and reads voxel files corresponding to the plurality of region blocks from the magnetic disk to the memory in advance in a streaming loading manner, to smoothly obtain the voxel files corresponding to the plurality of region blocks from the memory, smoothly update the scene in a game process, and improve the fluency of the game process, thereby improving user experience.

Streaming loading refers to loading scene data according to the temporal and spatial locality of a user. During the loading, a current position coordinate pair of the target object are first determined, and then, scene data of neighboring position coordinate pairs is loaded in advance. Using a scene including a plurality of rooms as an example, scene data of a room in which a target object is currently located is first loaded, scene data of a next room adjacent to the room in which the target object is located is preloaded, and the loading ends when the target object arrives at a next room; and it is continued to preload scene data of a next room, and so on.

The electronic device 110 in FIG. 1 may include a variety of mobile devices, including, but not limited to, a smartphone, a tablet computer, and a portable device, or may be a server that receives a scene update request from a mobile device and transmits an updated scene to the mobile device for display.

In the embodiments of the disclosure, when voxel files are read from the magnetic disk to the memory in advance, index files corresponding to the voxel files are also read from the magnetic disk to the memory, each region block including a plurality of position coordinate pairs, an index file including indexes corresponding to position coordinate pairs on a region block, an index corresponding to a position coordinate pair with voxels being an index corresponding to a starting voxel in all the voxels at the position coordinate pair, and an order of storing the index files on the magnetic disk being the same as an order of storing the voxel files on the magnetic disk. Therefore, after position coordinate pairs on a to-be-updated region block are determined, an index subscript is determined according to a position coordinate pair, an index of the position coordinate pair is determined according to the index subscript in the index file, and a starting voxel at the position coordinate pair is determined in the voxel file according to the index.

In the embodiments of the disclosure, when voxel files corresponding to a plurality of region blocks are read from the magnetic disk in a streaming loading manner in advance to the memory, a memory pressure indicator is monitored, and may be obtained by testing memory pressure. When it is determined that a memory pressure indicator is lower than a set upper limit threshold, and a page fault occurs, an mmap function of an operating system is called to read voxel files from the magnetic disk, and store the voxel files into a user space of the memory.

The mmap function is a method for mapping files on a memory, and is used for mapping a file or another object to a user space of the memory, to achieve a one-to-one mapping relationship between file disk addresses and a segment of virtual addresses in a user address space.

A user space, also referred to as a user address space, is a space in a memory provided for application programs to use and belongs to a user address space. The application programs may directly read data from the user space with obtaining a permission. A kernel space is in juxtaposition with the user space and is also a part of the memory, but the kernel space is shared by all system processes, belongs to a system address space, and requires an access permission. A sum of an occupation of the kernel space and an occupation of the user space is the entire memory. For different operating systems, the user space and the kernel space of the memory are divided into different sizes. Using an example in which a size of a memory is 4 G, on a Windows system, a lower 2 G address space (0x00000000-0x7FFFFFFF) in the 4 G address space is a user address space, and an upper 2 G address space (0x80000000-0xFFFFFFFF) in the 4 G address space is a system address space, that is, the kernel space. On a Linux system, uppermost 1 G (0xC0000000-0xFFFFFFFF) in a 4 G address space is divided into a system address space, that is, a kernel space, while lower 3 G (0x00000000-0xBFFFFFFF) is divided into a user address space, that is, user space. Therefore, the user space is used for storing data of application programs.

Due to low memory pressure, a large quantity of voxel files may be read to the memory at a time, to reduce a quantity of times of reading the magnetic disk, and improve input/output (I/O) performance. In addition, the voxel files are directly read to the user space, thereby improving reading efficiency of a game application program. When it is determined that a memory pressure indicator is greater than or equal to a set upper limit threshold, and a missing occurs in a cache, the voxel files are read from the magnetic disk by the game application program and stored in the cache space of the memory, to improve the reading speed of the game application program while reducing the memory pressure, and ensuring the fluency of the running of the program.

Therefore, an embodiment of the disclosure provides a solution of reading, in a scene update process, voxel files corresponding to a plurality of region blocks from a magnetic disk in advance and storing the voxel files to a memory, so that when a scene is updated, the game application program obtains voxels at position coordinate pairs from the memory. In addition, when the voxels at the position coordinate pairs are obtained from the memory, if it is determined that the memory does not store a voxel that needs to be obtained, a reading manner is determined according to a memory pressure indicator, to read the voxel files corresponding to the region blocks from the magnetic disk, to balance the memory pressure and the reading efficiency, improve the fluency of a game process, and improve user experience.

Figure 4:
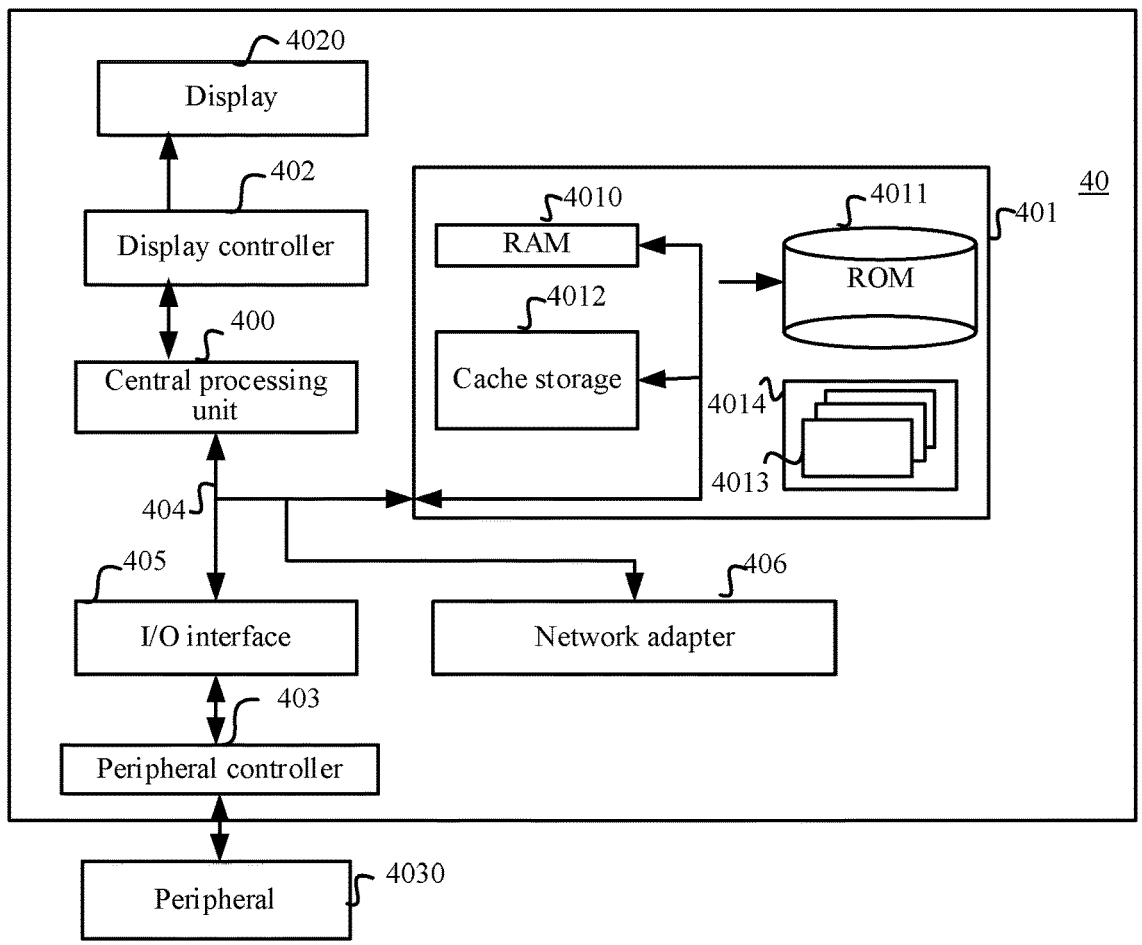
FIG. 4 is a schematic diagram of a scene update control scenario in an electronic device according to an example embodiment of the disclosure.

FIG. 4 is a diagram of an application scenario of voxel file obtaining according to an example embodiment of the disclosure. Components of an electronic device 40 on which a game application program is installed includes, but are not limited to, a CPU 400, a storage 401, a display controller 402, a peripheral controller 403, a message bus 404 connecting different system components (including the storage 401 and the processor 400), an input/output (I/O) device 405, and a network adapter 406.

The CPU 400 is an operation and control core, and a final execution unit of information processing and program operation. The storage 401 includes an internal storage 4010, an auxiliary storage 4011, and a cache storage 4012. Data required for running a game is stored on the internal storage 4010, and is lost after power-off. The auxiliary storage 4011 may be a magnetic disk, and is configured to store all data of a game application program without losing the data after power-off.

The storage 401 may further include a program/utility 4014 having a set of (at least one) program modules 4013. Such program modules 4013 include, but are not limited to an operating system, one or more application programs, another program module, and program data. Each of such examples or a combination thereof may include an implementation of a network environment.

The display controller 402 is configured to control a connected display 4020, and the display 4020 is configured to display a photograph, a video, a game interface, and the like.

The peripheral controller 403 is configured to control a connected peripheral 4030, the peripheral 4030 including a keyboard, a pointer, and the like. The electronic device communicates with one or more peripherals 4030 through the peripheral controller 403.

The message bus 404 represents one or more of several types of bus structures, including a storage bus or a storage controller, a peripheral bus, a processor, or a local bus using any bus structure among various bus structures. The message bus 404 is mainly configured to connect the CPU 400, the storage 401, the I/O device 405, and the like.

The I/O device 405 is used for communication with the electronic device.

The network adapter 406 may communicate with another module of the electronic device 40 through the bus 404. It is to be understood that although not shown in FIG. 4, other hardware and/or software modules may be used in conjunction with the electronic device 40, including, but not limited to, microcode, a device driver, a redundancy processing unit, an external magnetic disk driving array, a redundant array of independent disks (RAID) system, a magnetic tape drive, a data backup storage system, and the like.

In this embodiment of the disclosure, a storage space is configured for a game application program in memory of the internal storage 4010, and is used for storing game data required in a game process. The configured storage space may be a user space or a cache space of the memory. The cache space of the memory is a part of the memory, and is configured to store application program data that has been queried a plurality of times. A part of the memory is consumed as a cache, to improve the speed.

An operating system reads, according to request information of a game application program, a voxel file corresponding to the request information from the auxiliary storage 4011 through the message bus 404; reads, in advance, a plurality of voxel files stored consecutively together with the voxel file corresponding to the request information; and writes the voxel files that are read into the storage space. When loading a scene, the game application program reads the voxel files from the storage space, determines voxels at position coordinate pairs, and connects the voxels at the position coordinate pairs according to the position coordinate pairs, to generate the scene for display on the display 4020.

In a game process, a target object moves in a scene. Each time the target object moves, the scene displayed on the display changes once. The scene is generated by connecting voxels at a plurality of position coordinate pairs according to a sequence of the position coordinate pairs. Therefore, to determine a scene, voxels at position coordinate pairs of the scene need to be obtained. The game application program obtains, according to a position coordinate pair of the target object, voxels from voxel files stored on the memory. The voxel files stored on the memory are read in advance from the magnetic disk storing voxel files. The voxel files stored on the magnetic disk are voxel files corresponding to region blocks after the scene is divided into a plurality of region blocks including a plurality of position coordinate pairs.

The target object is a game character of a game player in a game scene. The game player controls position coordinate pairs and a game behavior of the game character in the game scene.

Figure 5:
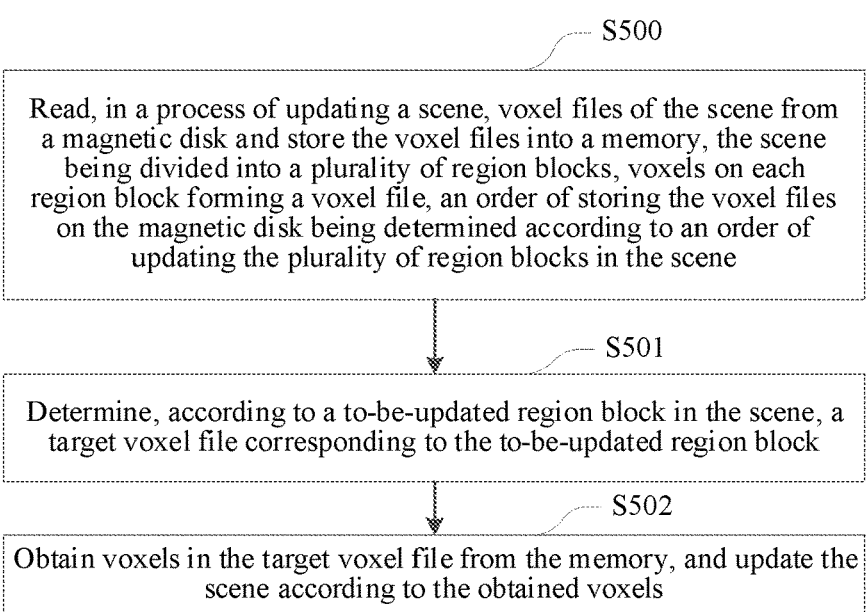
FIG. 5 is a flowchart of a scene update control method according to an embodiment of the disclosure.

FIG. 5 is a flowchart of a scene update control method according to an embodiment of the disclosure. The scene update control method is performed by an electronic device, for example, the electronic device 110 shown in FIG. 1, and includes following operations S500-S502:

Operation 500: Read, in a process of updating a scene, voxel files of the scene from a magnetic disk and store the voxel files into a memory, the scene being divided into a plurality of region blocks, voxels on each region block forming a voxel file, an order of storing the voxel files on the magnetic disk being determined according to an order of updating the plurality of region blocks in the scene (that is, the voxel files of the plurality of region blocks are stored on the magnetic disk according to an order in which the plurality of region blocks in the scene are to be updated).

In this embodiment of the disclosure, the magnetic disk stores voxel files and index files corresponding to all region blocks after the scene is divided. The voxel file is constituted by all voxels on a region block after scene voxelization, and each region block corresponds to one voxel file. The index file is determined according to position coordinate pairs in each region block.

Specifically, the voxel files and index files corresponding to the voxel files are read from the magnetic disk, and the voxel files and the index files that are read are stored into the memory. Each region block includes position coordinate pairs arranged in a matrix with a plurality of rows and a plurality of columns. Therefore, each region block includes a plurality of position coordinate pairs. Each position coordinate pair corresponds to one index. An index file including indexes corresponding to all position coordinate pairs on a region block. An index corresponding to a position coordinate pair with voxels is an index corresponding to a starting voxel in all the voxels at the position coordinate pair. In addition, the index files and the voxel files are stored in correspondence. An order of storing the index files on the magnetic disk is the same as an order of storing the voxel files on the magnetic disk, both being determined according to an order of updating the plurality of region blocks in the scene. Therefore, voxel files and index files of a plurality of region blocks are read in advance from the magnetic disk to the memory according to an update order of the scene. Further, during a scene update, according to a position coordinate pair of a game character in the scene, the index files in the memory are queried for an index of the position coordinate pair, the voxel files are queried for a starting voxel of the position coordinate pair according to the index, the game scene is recorded according to the voxel, and the memory is queried for a voxel, to ensure the fluency of the game process.

Figure 6:
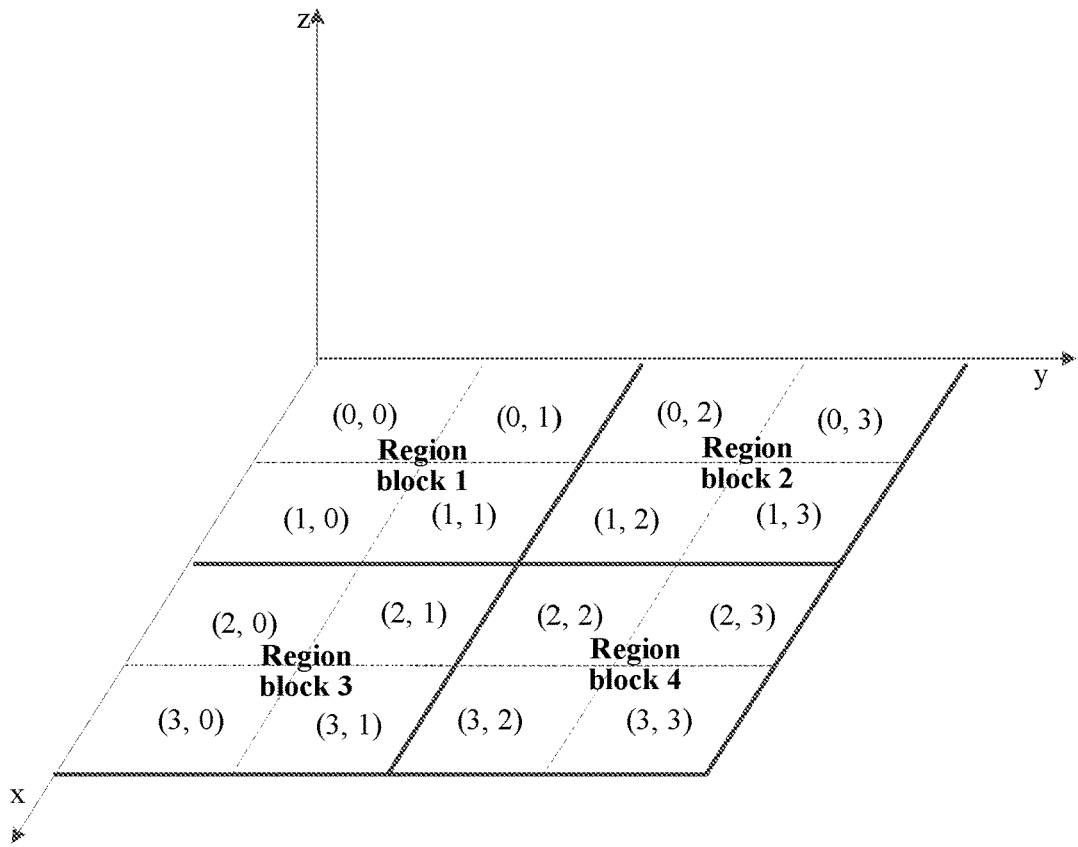
FIG. 6 is a schematic diagram of scene division according to an embodiment of the disclosure.

FIG. 6 is a schematic diagram of scene division according to the disclosure. In a scene of a 3D game application program, the scene is divided into a plurality of region blocks by using an XOY plane as the ground of the scene. A side length of each region block is an exponent of 2, and each region block includes position coordinate pairs arranged in a matrix with a plurality of rows and a plurality of columns.

As can be learned from FIG. 6, the game scene is divided into four 2*2 region blocks. Each region block includes four position coordinate pair arranged in a matrix with 2 rows and 2 columns. Each position coordinate pair corresponds to a grid. A size of each grid is consistent with a size of an upper surface or a lower surface of a voxel after the 3D scene is voxelized.

The magnetic disk stores voxel files and index files of all region blocks after the game scene is divided. In addition, storage orders of the voxel file and the index files are determined according to an order of updating region blocks on the scene. For example, in a scene update process, according to a current position coordinate pair of a target object, a scene corresponding to two region blocks adjacent, along a row direction, to a region block in which the current position coordinate pair of the target object is located is updated. In this case, it may be determined that the order of updating the region blocks in the scene is along the row direction. Therefore, voxel files and index files of region blocks stored on a magnetic disk are stored along a row direction.

First, a voxel file and an index file of the first region block in the first row are stored, and then, a voxel file and an index file of the second region block in the first row are stored until all the region blocks in the first row are stored. Subsequently, storing a voxel file and an index file of the first region block in the second row is performed, and so on.

In addition, when voxels in a voxel file and indexes in an index file of each region block are stored, the indexes corresponding to position coordinate pairs in the each region block are stored row by row, and the voxels are stored according to an order of storing the position coordinate pairs. For example, when being stored, a region block 1 is stored along the x-axis, (0, 0) and (0, 1) are first stored, and then, (1, 0) and (1, 1) are stored.

Figure 7:
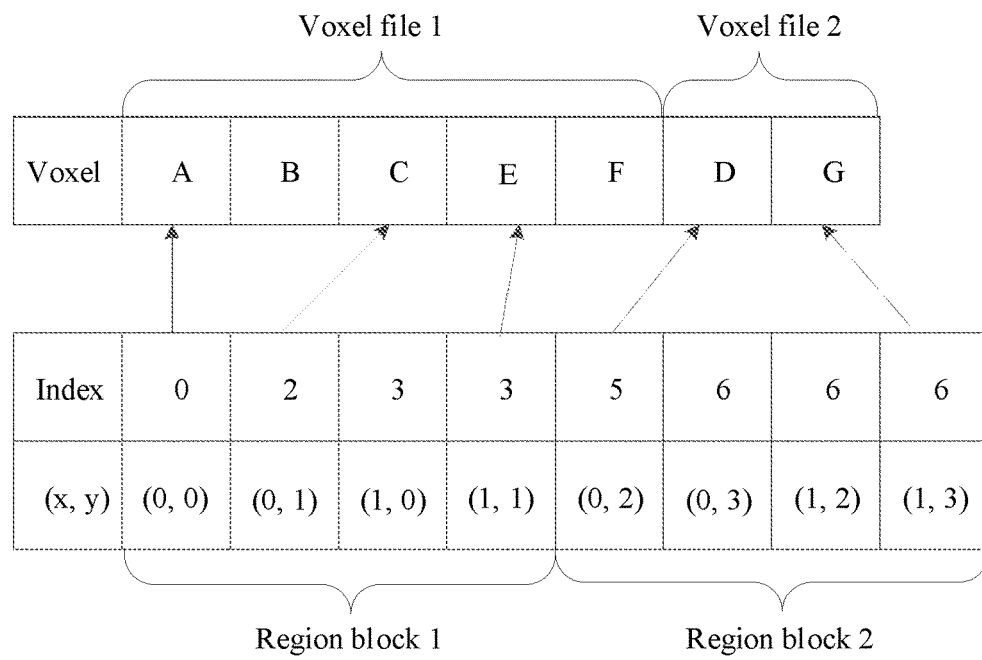
FIG. 7 is a schematic diagram of voxel files and index files of a region block stored on a magnetic disk according to an embodiment of the disclosure.

FIG. 7 is a schematic diagram of voxel files and index files of a region block stored on a magnetic disk according to an embodiment of the disclosure. As can be learned from FIG. 6, position coordinate pairs included in the region block 1 are (0, 0), (0, 1), (1, 0), and (1, 1), and position coordinate pairs included in the region block 2 are (0, 2), (0, 3), (1, 2), and (1, 3). Therefore, when the region block 1 is first stored, and then, the region block 2 is stored, an order of storing the position coordinate pairs is (0, 0), (0, 1), (1, 0), (1, 1), (0, 2), (0, 3), (1, 2), (1, 3), and indexes corresponding to the position coordinate pairs are correspondingly stored, as shown in FIG. 7.

As can be learned from FIG. 3, a position (0, 0) corresponds a voxel A and a voxel B, a position (0, 1) corresponds to a voxel C, there is no voxel at a position (1, 0), and a position (1, 1) corresponds to a voxel E and a voxel F. Therefore, the voxel file 1 includes 5 voxels A, B, C, E, and F in total, and the voxels are stored according to an order of storing the position coordinate pairs. A position (0, 2) corresponds to a voxel D, there is no voxel at a position (0, 3), there is no voxel at a position (1, 2), and a position (1, 3) corresponds to a voxel G. Therefore, the voxel file 2 includes two voxels D and G in total, and the voxels at the position coordinate pairs are stored according to the order of storing the position coordinate pairs, as shown in FIG. 7.

In the region block 1, an index subscript of a position coordinate pair (0, 0) is 0, and an index is determined in the index file according to the index subscript, and it is determined that the index points to a starting voxel A at the position coordinate pair (0, 0) in the voxel file. An index subscript of a position coordinate pair (0, 1) is 1, an index is determined in the index file according to the index subscript of 1, and it is determined that the index points to a starting voxel C at the position coordinate pair (0, 1) in the voxel file. In this embodiment of the disclosure, each position coordinate pairs corresponds to an index, and an index at a position coordinate pair with voxels points to a starting voxel of all voxels at the position coordinate pair. Correspondences between the voxel files and the index files have been determined during division of the voxelized scene.

In this embodiment of the disclosure, an order of updating region blocks in a scene is set when an application program is programmed, and the region blocks may be stored along a row direction or a column direction. The above is merely an example for description.

When the game application program is started, the operating system processes, according to a usage situation of the entire memory, an application submitted by the game application program, allocates memory for the game application program, and read in advance voxel files of some region blocks and corresponding index files from the magnetic disk to the memory.

Figure 8:
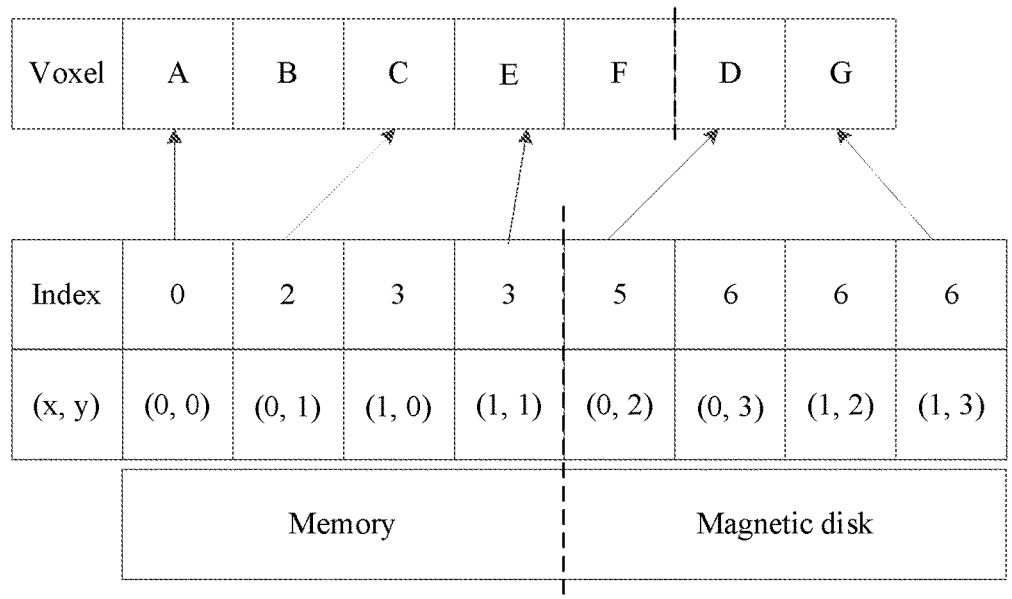
FIG. 8 is a schematic diagram of reading a voxel file and an index file of a region block from a magnetic disk in advance according to an embodiment of the disclosure.

FIG. 8 is a schematic diagram of reading a voxel file and an index file of a region block from a magnetic disk in advance according to an embodiment of the disclosure. As shown in FIG. 8, a voxel file of the region block 1 and an index file of the region block 1 are read in advance to the memory, and a manner of storing the voxel file and the index file on the memory is the same as that on the magnetic disk. When the target object moves to any position coordinate pair in the region block 1, a voxel file of the region block 2 and an index file of the region block 2 are read in advance to the memory, or according to a current position coordinate pair of the target object, voxel files of a plurality of region blocks adjacent to a region block in which the current position coordinate pair of the target object is located and corresponding index files are read in advance. Therefore, during running of the game application program, voxels are directly obtained from the memory, to update a game scene. Accordingly, compared with reading voxel files from the magnetic disk to the memory and then obtaining voxels from the memory, the method of controlling a game scene update according to an example embodiment has a higher speed, and improves the fluency of the game process.

The foregoing reading voxel files of region blocks and corresponding index files in advance from the magnetic disk to the memory is merely an example for description. In addition, quantities of voxel files corresponding to region blocks and corresponding index files that read in advance may differ from time to time. For example, only a voxel file and an index file of a region block at which a current position coordinate pair of a target object is located are read, or voxel files and index files of a plurality of region blocks centered around a region block at which a current position coordinate pair is located are read.

Operation 501: Determine, according to a to-be-updated region block in the scene, a target voxel file corresponding to the to-be-updated region block.

According to a current position coordinate pair of a target object in the scene, a specified quantity of surrounding region blocks centered around a region block in which the current position coordinate pair is located are determined as the to-be-updated region blocks. Voxel files corresponding to the specified quantity of region blocks are used as target voxel files.

The specified quantity of surrounding region blocks include N region blocks before the region block in which the current position coordinate pair is located and M region blocks after the region block in which the current position coordinate pair is located, M and N being integers. When M=0 and N=0, the region block in which the current position coordinate pair is located is the to-be-updated region block.

The previous N region blocks are N region blocks, in the plurality of region blocks stored on the magnetic disk, that are before the region block in which the current position coordinate pair is located and that are adjacent to the region block in which the current position coordinate pair is located. Using an example in which N=1, and the current position coordinate pair is (0, 2), as shown in FIG. 6, the current position coordinate pair (0, 2) is in the region block 2, and therefore, a previous region block is the region block 1.

Likewise, the next M region blocks are M region blocks, in the plurality of region blocks stored on the magnetic disk, that are after the region block in which the current position coordinate pair is located and that are adjacent to the region block in which the current position coordinate pair is located. Using an example in which M=1, and the current position coordinate pair is (0, 2), as shown in FIG. 6, the current position coordinate pair (0, 2) is in the region block 2, and therefore, a next region block is a region block 3.

When the target voxel file is determined according to the to-be-updated region block, the voxel file of the to-be-updated region block is used as the target voxel file. When the target voxel file is determined from the memory, a starting position coordinate pair in the first region block of the previous N region blocks and an ending position coordinate pair in the last region block in the next M region blocks are first determined, a first index subscript and a quantity of voxels at the starting position coordinate pair are determined according to the starting position coordinate pair, and a second index subscript and a quantity of voxels at the ending position coordinate pair are determined according to the ending position coordinate pair.

Whether there is a voxel at a position coordinate pair may be determined according to a quantity of voxels. When the quantity of voxels is 0, it is determined that there is no voxel at the position coordinate pair.

If there are voxels at both the starting position coordinate pairs and the ending position coordinate pair, a first index is determined according to the first index subscript in index files stored on the magnetic disk, and the first voxel of the target voxel file is determined according to the first index in the voxel files stored on the magnetic disk; a second index is determined according to the second index subscript in the index files stored on the magnetic disk, the last voxel of the target voxel file is determined according to the second index and the quantity of voxels at the ending position coordinate pair in the voxel files stored on the magnetic disk, and then, all voxels from the first voxel to the last voxel that are determined are read as the target voxel file.

Using FIG. 7 as an example for description, a current position coordinate pair is (1, 2), when M=0, and N=0, a region block 1 is used as a to-be-updated region block, it is determined that a starting position coordinate pair of a region block 2 is (0, 2), and a corresponding index subscript is 4 (that is, a sequence number corresponding to the position coordinate pair (0, 2)), an index is determined in the index file according to the index subscript of 4, and a starting voxel at (0, 2) to which the index points is a voxel D; and an index subscript of an ending position coordinate pair (1, 3) of the region block 2 is 7 (that is, a sequence number corresponding to the position coordinate pair (1, 3)), an index of the index subscript 7 in the index file is determined, a starting voxel at (1, 3) to which the index points is a voxel G, and if a quantity of voxels at (1, 3) is 1, it is determined that the last voxel is G. Therefore, all voxels from the voxel D to the voxel G are read from the voxel files as a target voxel file.

If there is no voxel at the starting position coordinate pair, a next coordinate pair following the starting position coordinate pair are determined; and/or if there is no voxel at the ending position coordinate pair, a previous coordinate pair before the ending position coordinate pair is determined until the first position coordinate pair with voxels are determined.

When a region block at which a current position coordinate pair of a target object is located in a scene is used as a to-be-updated region block, a starting position coordinate pair and an ending position coordinate pair of the region block are determined, and a first index subscript and a quantity of voxels at the starting position coordinate pair are determined according to the starting position coordinate pair, and a second index subscript and a quantity of voxels at the ending position coordinate pair are determined according to the ending position coordinate pair. If a quantity of voxels at the starting position coordinate pair is 0, a quantity of voxels corresponding to a next position coordinate pair adjacent to the starting position coordinate pair is determined, and/or if a quantity of voxels at the ending position coordinate pair is 0, a quantity of voxels corresponding to a previous position coordinate pair adjacent to the ending position coordinate pair is determined until a position coordinate pair with corresponding voxels is determined.

Figure 9:
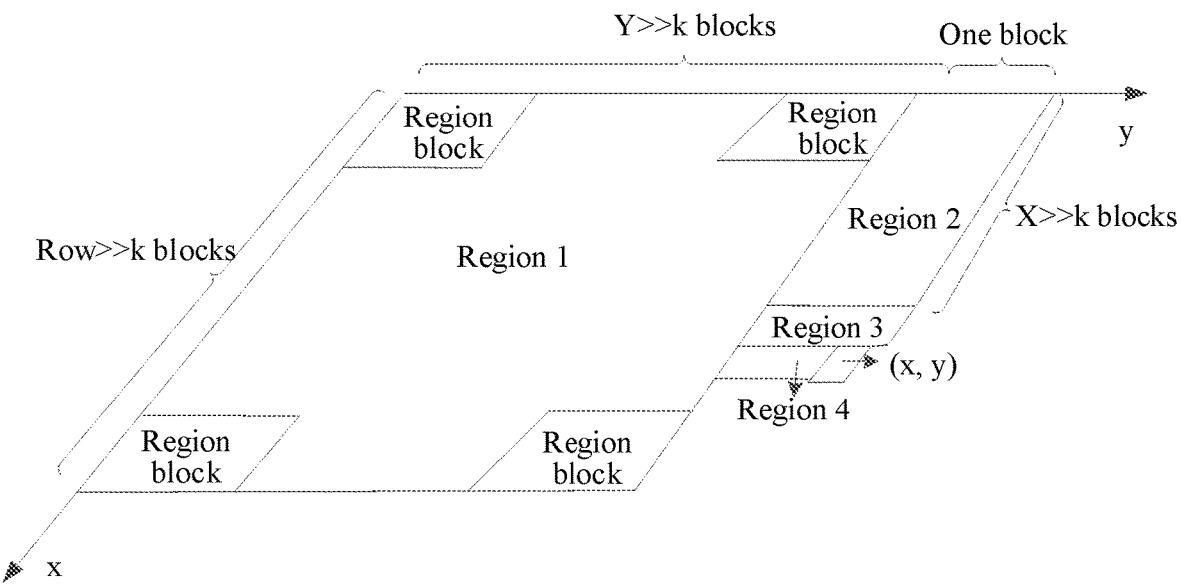
FIG. 9 is a schematic diagram of determining index subscripts of position coordinate pairs according to an order of storing region blocks according to an embodiment of the disclosure.

In this embodiment of the disclosure, a storage sequence number of a position coordinate pair on the magnetic disk is determined according to a storage order of region blocks in a scene and a storage order of position coordinate pairs in each region block, and an index subscript of the each position coordinate pair is determined according to the storage sequence number. When an index subscript of a position coordinate pair is determined, a total quantity of grids before the position coordinate pair is determined. FIG. 9 is a schematic diagram of determining index subscripts of position coordinate pairs according to an order of storing region blocks according to an embodiment of the disclosure. Using FIG. 9 as an example, the determining an index subscript according to a position coordinate pair in the disclosure is described.

It is assumed that a current position coordinate pair is (x, y), a total quantity of grids before (x, y) is a total quantity of a region 1, a region 2, a region 3, and a region 4. The region 1 includes $(y/2^k)*(row/2^k)$ region blocks divided from a scene, each region block further including $(2^k)*(2^k)$ grids. Therefore, a total quantity of grids of the region 1 is $(y/2^k)*(row/2^k)*(2^k)*(2^k)$. The region 2 includes $x/2^k$ region blocks divided from the scene, each region block further including $(2^k)*(2^k)$ grids. Therefore, a total quantity of grids included in the region 2 is $(x/2^k)*(2^k)*(2^k)$. The region 3 includes $x\%(2^k)$ rows in total, each row including $2^k$ grids. Therefore, a total quantity of grids of the region 3 is $x\%(2^k)*(2^k)$. The region 4 includes only one row and $y\%(2^k)$ columns. Therefore, a total quantity of grids of the region 4 is $y\%(2^k)$.

Total quantity of grids=$(y/2^k)*(row/2^k)*(2^k)*(2^10+(x/2^k)*(2^k)*(2^10+x\%(2^k)*2^k+y\%(2^10)$.

Bit operation conversion is performed. After the conversion:

total quantity of grids=$((y>>k)*(row>>k)+(x>>k))<<k<<k+(x\&(2^k-1))<<k+y\&(2^k-1)$ where k=log2(a side length of a region block), for example, if the size of each region block is 32*32, k=5; row is a quantity of rows, the quantity of rows is a multiple of $2^k$, if the quantity of rows is less than a multiple of $2^k$, the quantity of rows is automatically supplemented, for example, if row=51, which is less than a multiple of $2^k$, the quantity of rows is supplemented to row=64; and in case of presence of col, col is a quantity of columns, the quantity of columns is also a multiple of $2^k$, and if the quantity of columns is less than a multiple of $2^k$, the quantity of columns is automatically supplemented similar to that of the quantity of rows row.

By analog, an index subscript of each position coordinate pair may be determined.

Assuming that (x, y) is (1, 3), k=1, and row=2, x=1 and y=3 are substituted to $((y>>k)*(row>>k)+(x>>k))<<k<<k+(x\&(2^k-1))<<k+y\&(2^k-1)$, so that it may be determined that the index subscript is 7, and a starting voxel of the position coordinate pair (1, 3) may be determined according to the index subscript. As shown in FIG. 7, it is determined that the starting voxel of the position coordinate pair (1, 3) is G.

In this embodiment of the disclosure, a quantity of voxels at the position coordinate pair (x, y) is calculated according to a formula index[x*col+y+1]ˆindex[x*col+y], where col is a quantity of columns and is determined according to the size of a divided region block.

Therefore, after the position coordinate pair of the target object is determined, a to-be-updated region block may be determined according to the position coordinate pair, and a target voxel file corresponding to the to-be-updated region block is determined. After the target voxel file that needs to be obtained is determined, the target voxel file is obtained from the memory, and voxels at position coordinate pairs are determined.

An execution order of operation 500 and operation 501 is not specifically defined. Operation 501 may be performed after operation 500 is performed, and vice versa.

Operation 502: Obtain voxels in the target voxel file from the memory, and update the scene according to the obtained voxels.

Because the voxel files stored on the memory are read in advance from the magnetic disk, but the voxel files that are read from the memory may not include the target voxel file that the game application program needs to obtain, when the target voxel file is queried from the memory, whether the voxel files stored on the memory include the target voxel file is determined. If the memory stores the target voxel file, voxels are directly read from the target voxel file, and the scene is updated according to the obtained voxel. If the memory does not store the target voxel file, the target voxel file is read from the magnetic disk to the memory, and voxels in the target voxel file are further obtained from the memory, and the scene is updated according to the obtained voxels.

I. The memory stores the target voxel file.

That the memory stores the target voxel file may be that the user space of the memory stores the target voxel file, or the cache space of the memory stores the target voxel file.

When the target voxel file is obtained from the memory, the target voxel file is obtained according to storage positions of voxel files on the memory. If both the cache space of the memory and the user space of the memory store voxel files, whether the cache space of the memory stores voxel file is determined first, and if yes, the target voxel file is directly obtained from the cache space of the memory due to a higher obtaining rate in the cache space; otherwise, the target voxel file is obtained from the user space of the memory.

Voxels at position coordinate pairs are determined while obtaining the target voxel file, the voxels at the position coordinate pairs are spliced according to position coordinate pairs of the position coordinate pairs in the scene, and the scene is updated.

In this embodiment of the disclosure, for each position coordinate pair on a region block corresponding to the target voxel file, an index subscript and a quantity of voxels corresponding to the each position coordinate pair are determined, and an index corresponding to a position coordinate pair with voxels is determined according to the determined index subscript in an index file that is stored on the memory and that corresponds to the target voxel file; further, a starting voxel of the position coordinate pair is determined in the target voxel file according to the index; and finally, voxels at the position coordinate pair are determined according to the starting voxel and a quantity of voxels at the position coordinate pair, and after voxels at all position coordinate pairs in the region block corresponding to the target voxel file are determined, the scene is updated according to the voxel at the position coordinate pairs.

In this process, for a manner of determining the index subscript and the quantity of voxels, reference may be made to the foregoing embodiments, and details are not described herein.

When the memory stores the target voxel file, the game application program may directly obtain voxels in the target voxel file from the memory. For example, when the user space of the memory stores the target voxel file, game the application program obtains the target voxel file from the user space of the memory without first querying whether the cache space of memory stores the target voxel file.

II. The memory does not store the target voxel file.

When the cache space of the memory does not store the target voxel file, and the user space of the memory does not store the target voxel file, it is determined that the memory does not store the target voxel file.

Figure 10:
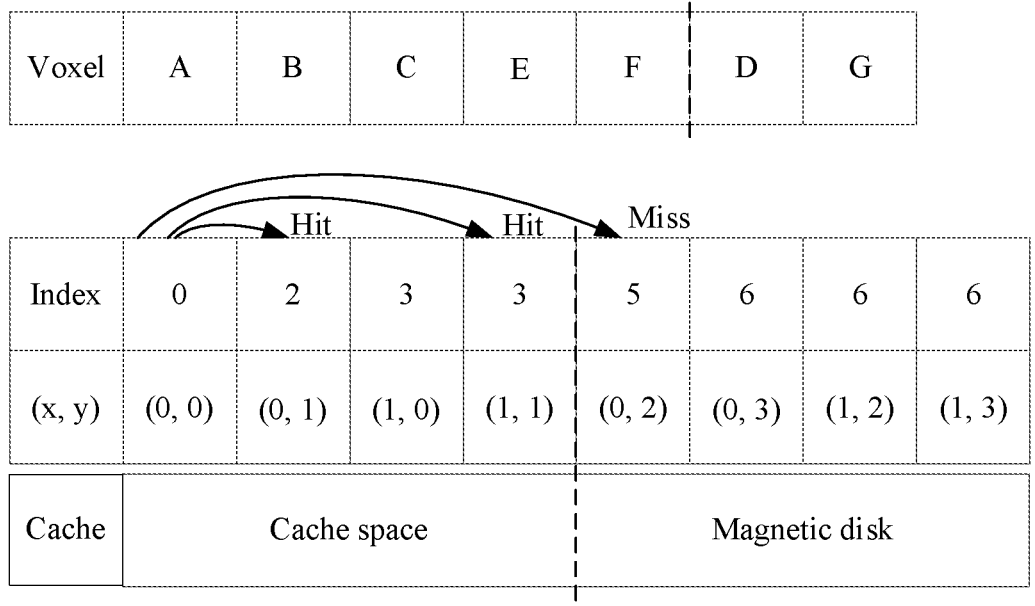
FIG. 10 is a schematic diagram of voxels in a target voxel file being missed in a cache according to an embodiment of the disclosure.

To obtain voxels in the target voxel file from the memory, the voxels in the target voxel file are first queried from the cache space of the memory. When it is determined that the cache space does not store the voxels in the target voxel file, it is determined that the voxels in the target voxel file are missed in the cache space. FIG. 10 is a schematic diagram of voxels in a target voxel file being missed in a cache space. Assuming that the target voxel file is a voxel file corresponding to the region block 2, and the cache space only stores a voxel file of the region block 1 and does not store the voxel file of the region block 2, a missing occurs in the cache space.

Figure 11:
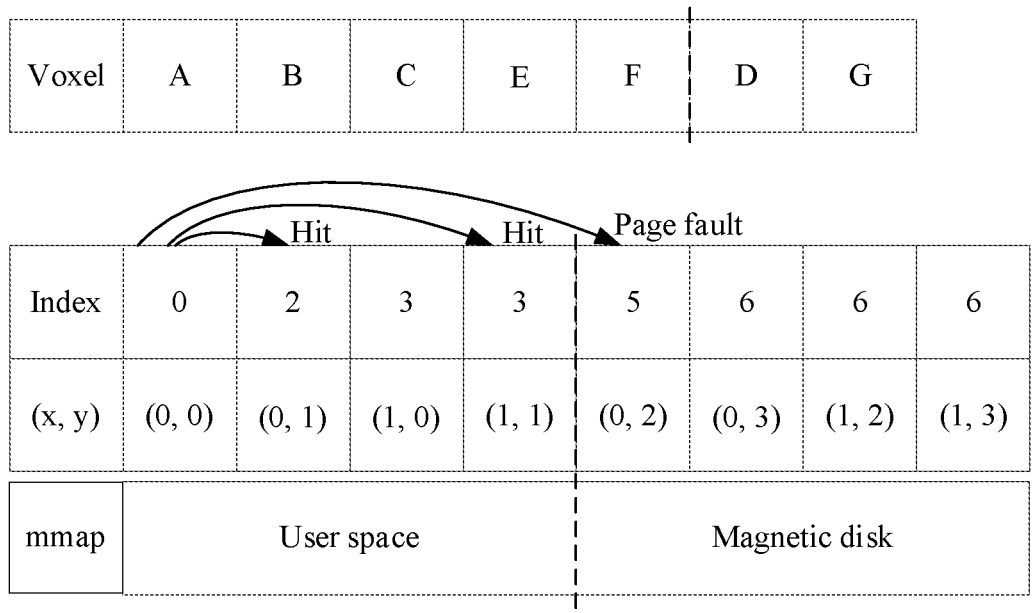
FIG. 11 is a schematic diagram of a page fault according to an embodiment of the disclosure.

When it is determined that the cache space does not store the target voxel file, the target voxel file is queried from the user space of the memory, and when it is determined that the memory does not store voxels of the target voxel file, a page fault occurs. FIG. 11 is a schematic diagram of occurrence of a page fault.

When it is determined that the memory does not store the target voxel file, a memory pressure indicator is monitored, and different reading manners are adopted according to the memory pressure indicator to read the target voxel file from the magnetic disk as follows:

Case 1: A memory pressure indicator is lower than an upper limit threshold.

When a memory pressure indicator is lower than a set upper limit threshold, and a page fault occurs, all the voxel files and the index files corresponding to the voxel files are read from the magnetic disk, and stored to a user space of the memory.

When the target voxel file is queried from the memory, it is determined that the target voxel file is not on the physical memory, which causes a page fault, and in addition, it is determined that the memory pressure indicator is lower than the set upper limit threshold. To ensure the fluency of the game process, an mmap function of an operating system is called, and voxel files corresponding to an integer number of region blocks that are centered around a region block in which a current position coordinate pair is located and that are adjacent to the region block in which the current position coordinate pair is located and index files corresponding to the voxel files are read from the magnetic disk according to a size of each page in the operating system. In this way, several pages of voxel files and corresponding index files are automatically read from the magnetic disk to the user space of the memory. The several pages of voxel files that are read are related to the size of each page in the operating system, and the several pages of voxel files that are read and the corresponding index files are voxel files and index files corresponding to a plurality of consecutive region blocks centered around a region block in which a current position of a game player in a game scene is located.

Assuming that the size of each page of the operating system is 64 K, and the size of each region block is 128 rows*128 columns, each region block is 64 KB. In this case, the voxel file of the region block in which the current position coordinate pair of the target object is located may only be read from the magnetic disk. A starting position coordinate pair and an ending position coordinate pair corresponding to the region block in which the current position coordinate pair of the target object is located are determined. A corresponding first index subscript is determined according to the starting position coordinate pair. A corresponding second index subscript is determined according to the ending position coordinate pair. In addition, a quantity of voxels of the ending position coordinate pair is determined according to the ending position coordinate pair. A starting voxel is determined according to the first index subscript, and an ending voxel is determined according to the second index subscript and the quantity of voxels. The starting voxel to the ending voxel are read to form a voxel file.

For example, the region block in which the current position coordinate pair of the target object is located is a region block 1, a starting position coordinate pair of the region block 1 is (0, 0), and an ending position coordinate pair is (1, 1). If an index subscript of (0, 0) is 0, (0, 0) is determined to be the first position in the index file and points to a voxel A. If an index subscript of (1, 1) is 4, (1, 1) is determined to the fourth position in the index file, and points to a voxel E, and if a quantity of voxels at (1, 1) is calculated to be 2, reading is continuously performed until a voxel F is read. The voxel A to the voxel F that are read form a voxel file.

Assuming that the size of each page of the operating system is 32 K, and the size of the region block is 32 rows*32 columns, each region block is 4 KB. In this case, the operating system may read voxel files of a plurality of region blocks from the magnetic disk. If it is determined that voxel files of three consecutive region blocks centered around a region block in which a current position coordinate pair of the target object is located are read, the region block in which the current position coordinate pair of the target object is located is determined. Further, a starting position coordinate pair of a region block before the region block in which the current position coordinate pair of the target object is located and an ending position coordinate pair of a region block after the region block in which the current position coordinate pair of the target object is located are determined. A corresponding first index subscript is determined according to the starting position coordinate pair. A corresponding second index subscript is determined according to the ending position coordinate pair. In addition, a quantity of voxels of the ending position coordinate pair is determined according to the ending position coordinate pair. A starting voxel is determined according to the first index subscript, and an ending voxel is determined according to the second index subscript and the quantity of voxels. The starting voxel to the ending voxel are read to form a voxel file.

In this embodiment of the disclosure, reading a voxel file of a region block in an mmap manner, compared with storing a voxel file row by row in the related technology, may reduce a quantity of page faults, and further, avoid freezing of the game process caused by a page fault and performance loss caused by an excessive number of inputs/outputs.

Because voxels are stored row by row in the related technology, when a target object moves from (0, 0) to a position coordinate pair (0, 1), because 4 KB of game data is obtained in advance, corresponding voxels at (0, 1) are stored on the memory and may be directly read from the memory. However, when the target object moves from (0, 0) to (1, 0), because only 4 KB of game data is obtained in advance, the size of a row of voxels is 20*20 bytes. Therefore, voxels corresponding to (1, 0) are not stored on the memory, causing a page fault. If the target object always moves along a direction X, each time the target object moves, a page fault occurs. If the target object moves 40000 grids along the direction X, 40000 page faults are caused, which consumes a large amount of memory and time. If all voxels are stored on the memory, the memory needs to be accessed 40000 times, and the I/O may cause a performance loss.

However, in this embodiment of the disclosure, voxels are stored in the form of a region block, and when the voxels are read, a voxel file corresponding to the region block is read. Descriptions may be made with reference to FIG. 3, FIG. 6, and FIG. 7. Assuming that voxels of each position coordinate pair in each region block occupy 4 K, when the target object is located at (0, 0), voxels of a region block 1 corresponding to (0, 0) are all obtained in advance from the magnetic disk to the memory, that is, voxels at (0, 0), (0, 1), (1, 0), and (1, 1) are all stored on the memory. In this case, when the target object moves from (0, 0) to (1, 0), voxels may be directly read from the memory without a page fault. If the target object moves 40000 grids along the direction X, about 1300 page fault occurs, and compared with the related art, a quantity of page faults are greatly reduced, thereby further reducing memory and time consumption while improving I/O performance.

After voxel files and corresponding index files are read in an mmap manner from the magnetic disk to the user space of the memory, if current data is not needed, the operating system needs to release the data, which increases working pressure of the operating system. In this embodiment of the disclosure, to reduce the pressure of the operating system, it is determined that an mmap function is actively called each time a game scene is switched, to release a memory mapping.

Case 2: A memory pressure indicator is higher than or equal to an upper limit threshold.

When a memory pressure indicator is greater than or equal to a set upper limit threshold, and voxels in the target voxel file are missed in a cache, all the voxel files and the index files corresponding to the voxel files are read from the magnetic disk and stored into a cache space of the memory.

When the memory pressure indicator is higher than or equal to the upper limit threshold, and the cache space of the memory does not store the target voxel file, voxel files of a plurality of consecutive region blocks (e.g., three consecutive region blocks) centered around a region block in which a current position coordinate pair is located and index files corresponding to the voxel files are read from the magnetic disk.

In this case, if the voxel files and the corresponding index files are still read from the magnetic disk in the mmap manner, frequent page changes may be caused, which affects different performance of the electronic device. Therefore, a small quantity of voxel files and corresponding index files are read from the magnetic disk in a caching manner, and are consecutively stored in the cache space of the memory.

Assuming that a current position coordinate pair is (x, y), and the size of a region block divided from the scene is $(2^k)*(2^k)$, voxel files of three consecutive region blocks centered long the direction X around a region block that corresponds to the current position coordinate pair and that is divided from the scene are used as an example.

An upper left vertex coordinate pair of a previous region block of the region block that corresponds to the current position coordinate pair and that is divided from the scene is calculated using a bit operation method: left(x1, y1)= ((x>>k)<<k−$2^k$, (y>>k)<<k), and a lower right vertex coordinate pair of a next region block: right(x2, y2)= ((x>>k)$^{<<k+}2^k$+$2^k$, (y>>k)<<k+$2^k$).

An index subscript of left(x1, y1) and an index subscript of right(x2, y2) are determined according to the calculated position coordinate pairs, and voxels corresponding to the index subscript of left(x1, y1) and index subscript of right (x2, y2) are read from the voxel file according to the calculated index subscript of left(x1, y1) and index subscript of right(x2, y2). A quantity of the voxels is calculated according to index[x*col+y+1]^index[x*col+y].

The index subscript of left(x1, y1) and index subscript of right(x2, y2) are calculated. That is, a quantity of grids before the position coordinate pair left(x1, y1) and a quantity of grids before the position coordinate pair right(x2, y2) are determined. That is, the index subscript is determined according to an order of storing position coordinate pairs. An index subscript of the first position coordinate pair is 0, which corresponds to the first stored index, an index subscript of the second position coordinate pairs is 1, which corresponds to the second stored index, and so on.

After voxel files of three consecutive region blocks centered around the region block that the current position is located and corresponding index files are read from the magnetic disk, the voxel files and the corresponding index files that are read are stored as a group of data into the cache space of the memory. When the voxel files and the corresponding index files that are read are stored in the cache space of the memory: in the cache space of the memory, a least recently used group of data in the cache space is determined by using a least recently used algorithm, and the least recently used group of data in the cache space is overwritten by using the voxel files and the corresponding index file that are read, that is, voxel files of the three consecutive region blocks and the corresponding index files are currently stored in the cache space of the memory.

In this embodiment of the disclosure, when the voxel files and the index files corresponding to the voxel file that are read are sequentially written into the memory, a to-be-updated region block is determined according to the current position coordinate pair of the target object, position coordinate pairs in the to-be-updated region block are determined, and index subscripts of the position coordinate pairs are determined according to the position coordinate pairs; an index subscript and a quantity of voxels at the current position coordinate pair are calculated according to the coordinate pair determined in the index file, an index corresponding to a position coordinate pair with voxels is determined according to the index subscript, and a starting voxel at the position coordinate pair is determined according to the index in the voxel file; and finally, voxels corresponding to the current position coordinate pair are determined according to the starting voxel and the quantity of voxels, and a scene of the current position coordinate pair is depicted according to the voxels. For an example of a specific manner for the foregoing, reference may be made to a manner of reading voxel files from the magnetic disk as described above.

Figure 12:
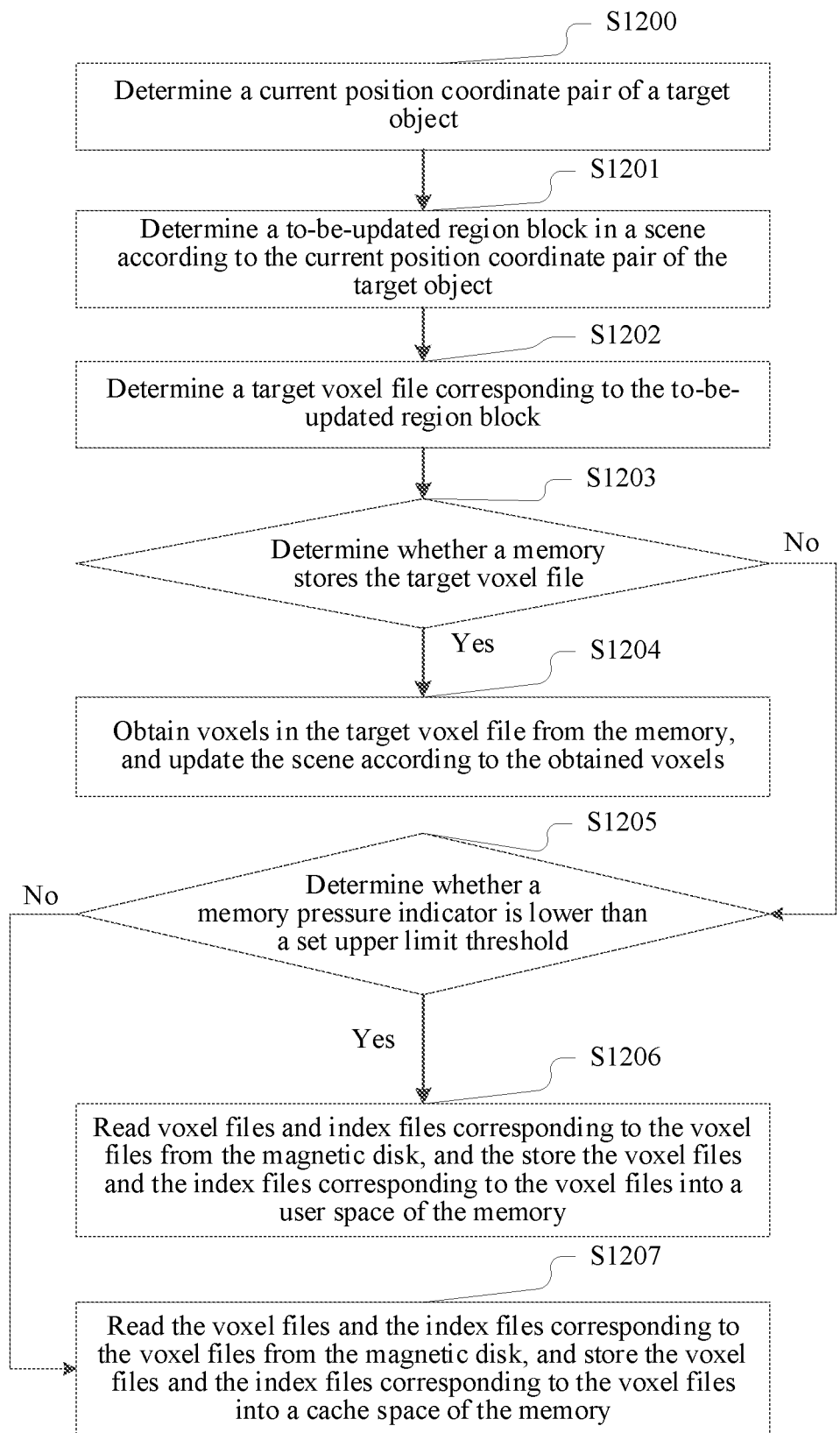
FIG. 12 is a flowchart of another scene update control method according to an embodiment of the disclosure.

FIG. 12 is a flowchart of another scene update control method according to an embodiment of the disclosure. The scene update control method may be performed by an electronic device, for example, the electronic device 110 shown in FIG. 1. In this method, a target voxel file is first determined, and then how to read the voxel file and an index file from a magnetic disk and store the voxel file and the index file to memory is determined according to a memory pressure indicator. Specifically, the method includes following operations:

Operation 1200: Determine a current position coordinate pair of a target object.

Operation 1201: Determine a to-be-updated region block in a scene according to the current position coordinate pair of the target object.

Operation 1202: Determine a target voxel file corresponding to the to-be-updated region block.

Operation 1203: Determine whether the memory includes the target voxel file, and if yes, perform operation 1204; otherwise, perform operation 1205.

Operation 1204: Obtain voxels of the target voxel file from the memory, and update the scene according to the obtained voxels.

Operation 1205: Monitor a memory pressure indicator, determine whether the memory pressure indicator is lower than a set upper limit threshold, and if yes, perform operation 1206; otherwise, perform operation 1207.

Operation 1206: Read voxel files and index files corresponding to the voxel files from the magnetic disk, and the store the voxel files and the index files corresponding to the voxel files into a user space of the memory.

Operation 1207: Read the voxel files and the index files corresponding to the voxel files from the magnetic disk, and store the voxel files and the index files corresponding to the voxel files into a cache space of the memory.

Figure 13:
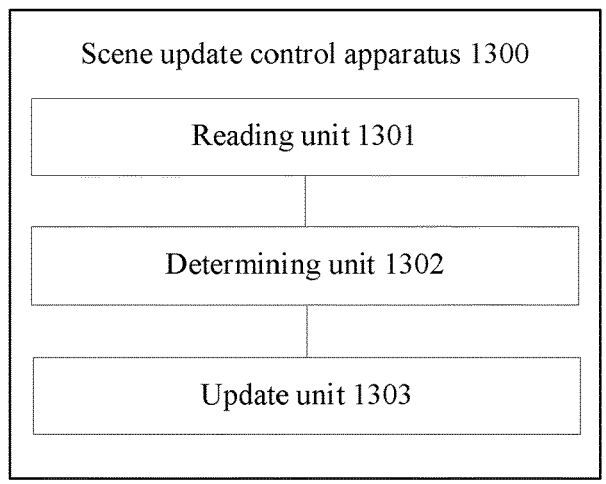
FIG. 13 is a structural diagram of a scene update control apparatus according to an embodiment of the disclosure.

Based on the same inventive concept, the disclosure further provides a scene update control apparatus. FIG. 13 is a structural diagram of a scene update control apparatus according to an embodiment of the disclosure. As shown in FIG. 13, the apparatus 1300 includes: a reading unit 1301, a determining unit 1302, and an update unit 1303.

The reading unit 1301 is configured to read, in a process of updating a scene, voxel files of the scene from a magnetic disk and store the voxel files into a memory, the scene being divided into a plurality of region blocks, voxels on each region block forming a voxel file, an order of storing the voxel files on the magnetic disk being determined according to an order of updating the plurality of region blocks in the scene.

The determining unit 1302 is configured to determine, according to a to-be-updated region block in the scene, a target voxel file corresponding to the to-be-updated region block.

The update unit 1303 is configured to obtain voxels in the target voxel file from the memory, and update the scene according to the obtained voxels.

In an example embodiment, the reading unit 1301 is further configured to:

read the voxel files and index files corresponding to the voxel files from the magnetic disk, and store the voxel files and the index files that are read into the memory, each region block including a plurality of position coordinate pairs, an index file including indexes corresponding to position coordinate pairs on a region block, an index corresponding to a position coordinate pair with voxels being an index corresponding to a starting voxel in all the voxels at the position coordinate pair, and an order of storing the index files on the magnetic disk being the same as an order of storing the voxel files on the magnetic disk.

In an example embodiment, the determining unit 1302 is further configured to:

determine, according to a current position coordinate pair of a target object in the scene, a specified quantity of surrounding region blocks centered around a region block in which the current position coordinate pair is located as the to-be-updated region blocks; and use voxel files corresponding to the specified quantity of region blocks as the target voxel files.

In an example embodiment, the specified quantity of surrounding region blocks include N region blocks before the region block in which the current position coordinate pair is located and M region blocks after the region block in which the current position coordinate pair is located, M and N being integers.

In an example embodiment, the update unit 1303 is further configured to:

determine, for each position coordinate pair on a region block corresponding to the target voxel file, an index subscript corresponding to the each position coordinate pair and a quantity of voxels at the each position coordinate pair;

determine, according to the index subscript, an index corresponding to a position coordinate pair with voxels in an index file corresponding to the target voxel file, and determine a starting voxel at the position coordinate pairs in the target voxel file according to the index; and obtain voxels at all position coordinate pairs from the memory according to the starting voxel and a quantity of voxels, and update the scene according to the obtained voxels.

In an example embodiment, the reading unit 1301 is further configured to:

read, when a memory pressure indicator is lower than a set upper limit threshold, and a page fault occurs, all the voxel files and the index files corresponding to the voxel files from the magnetic disk, and store the voxel files and the index files into a user space of the memory; or read, when a memory pressure indicator is greater than or equal to a set upper limit threshold, and voxels in the target voxel file are missed in a cache, all the voxel files and the index files corresponding to the voxel files from the magnetic disk, and store the voxel files and the index files into a cache space of the memory.

In an example embodiment, the reading unit 1301 is further configured to:

call, when a memory pressure indicator is lower than a set upper limit threshold, and a page fault occurs, an mmap function of an operating system; read, from the magnetic disk according to a size of each page in the operating system, voxel files corresponding to an integer number of region blocks that are centered around a region block in which a current position coordinate pair is located and that are adjacent to the region block in which the current position coordinate pair is located, and index files corresponding to the voxel files; and store the voxel files and the index files into a user space of the memory; or read, when a memory pressure indicator is greater than or equal to a set upper limit threshold, and voxels in the target voxel file are missed in a cache, voxel files of three consecutive region blocks centered around a region block in which a current position coordinate pair is located and index files corresponding to the voxel files from the magnetic disk; and store the voxel files and the index files into a cache space of the memory.

For ease of description, the foregoing components are respectively described as various units (or models) divided according to functions. Certainly, during implementation of the disclosure, the function of the units (or modules) may be implemented in the same piece of or multiple pieces of software or hardware.

In some example embodiments, the disclosure provides an electronic device 1400, including at least components such as a radio frequency (RF) circuit 1401, a power supply 1402, a processor 1403, a storage 1404, a user input unit 1405, a display unit 1406, an audio output unit 1407, an input unit 1408, a network module 1409, an interface unit 1410, and a camera 1411. A person skilled in the art would understand that the electronic device structure shown in FIG. 14 does not constitute a limitation to the electronic device. The electronic device provided in the embodiments of the disclosure may include more or fewer components than those shown in the figure, may combine some components, or may have different component arrangements.

Figure 14:
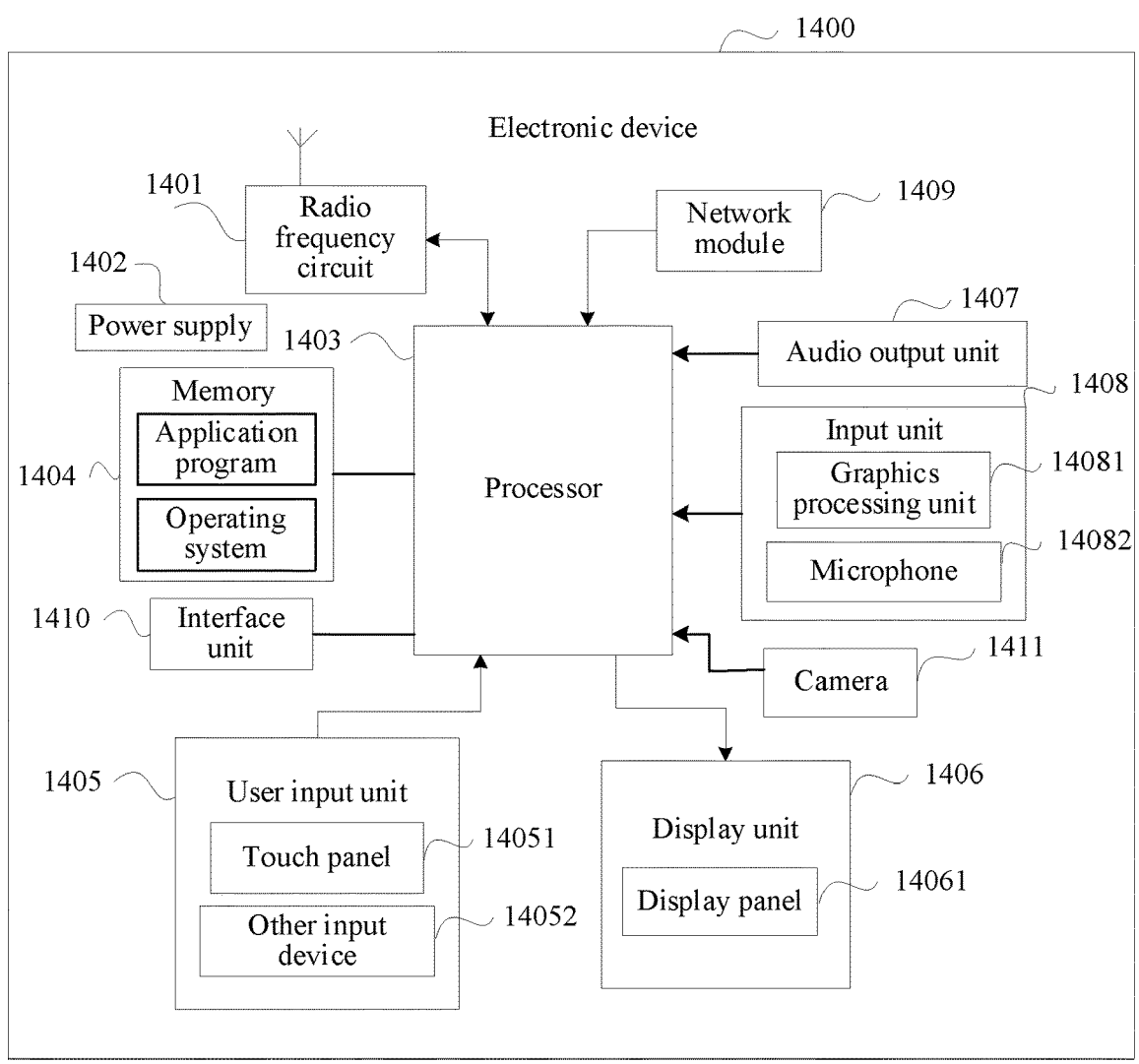
FIG. 14 is a structural diagram of an electronic device according to an embodiment of the disclosure.

The following makes specific introduction of components of the electronic device 1400 with reference to FIG. 14.

The RF circuit 1401 may be configured to receive and transmit signals in a communication or call process. Particularly, after receiving downlink data from a base station, the RF circuit 1401 transmits the downlink data to the processor 1403 for processing, and transmits to-be-transmitted uplink data to the base station. Usually, the RF circuit 1401 includes, but is not limited to, an antenna, at least one amplifier, a transceiver, a coupler, a low noise amplifier (LNA), and a duplexer.

In addition, the RF circuit 1401 may also communicate with a network and another terminal device by wireless communication. For wireless communication, any communication standard or protocol may be used, including, but not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

For the network module 1409, since the network is a wireless transmission technology. The electronic device 1400 may be connected to an access point (AP) by the network module 1409, to implement access to a data network. The network module 1409 may be configured to receive and transmit data in a communication process.

The electronic device 1400 may be physically connected to another device by the interface unit 1410. In an example embodiment, the interface unit 1410 is connected to an interface of another device by a cable, to implement data transmission between the electronic device 1400 and the other device.

Because in the embodiments of the disclosure, the electronic device 1400 may implement a communication service, and transmit information to another contact, the electronic device 1400 needs to have a data transmission function. That is, the electronic device 1400 needs to include a communication module internally. Although FIG. 14 shows communication modules such as the RF circuit 1401, the network module 1409, and the interface unit 1410, it may be understood that, at least one of the foregoing components or another communication module (for example, a Bluetooth module) for implementing communication exists in the electronic device 1400, to perform data transmission.

For example, when the electronic device 1400 is a mobile phone, the electronic device 1400 may include an RF circuit 1401 and may further include a network module 1409. When the electronic device 1400 is a computer, the electronic device 1400 may include an interface unit 1410 and may further include a network module 1409. When the electronic device 1400 is a tablet computer, the electronic device 1400 may include a network module 1409.

The storage 1404 may be configured to store a software program and a module. The processor 1403 performs various functional applications and data processing of the electronic device 1400 by running software programs and modules stored on the storage 1404, and when executing program code stored in the storage 1404, the processor 1403 may implement a part or all of a scene update control process in the embodiments of the disclosure.

The storage 1404 may mainly include a program storage region and a data storage region. The program storage region may store an operating system, various application programs (for example, a communication application), a face recognition module, and the like. The data storage region may store data (for example, various multimedia files, such as pictures and video files, and a face information template) created according to use of the terminal device, or the like.

In addition, the storage 1404 may include a high-speed random access memory, and may also include a nonvolatile memory, for example, at least one magnetic disk storage device, a flash memory, or another volatile solid-state storage device.

The user input unit 1405 may be configured to receive inputted digit or character information, and generate a keyboard signal input related to the user setting and function control of the electronic device 1400.

In an example embodiment, the user input unit 1405 may include a touch panel 14051 and another input device 14052.

The touch panel 14051, which may also be referred to as a touch screen, may collect a touch operation of a user on or near the touch panel 14051 (such as an operation of a user on the touch panel 14051 or near the touch panel 14051 by using any suitable object or accessory such as a finger or a stylus), and drive a corresponding connection apparatus according to a preset program. In an example embodiment, the touch panel 14051 may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and sends the touch point coordinates to the processor 1403. Moreover, the touch controller may receive and execute a command sent from the processor 1403. In addition, the touch panel 14051 may be implemented by using various types, such as a resistive type, a capacitance type, an infrared type, and a surface acoustic wave type.

In an example embodiment, the another input device 14052 may include, but is not limited to, one or more of a physical keyboard, a functional key (such as a volume control key or a switch key), a track ball, a mouse, and a joystick.

The display unit 1406 may be configured to display information input by the user or information provided for the user, and various menus of the electronic device 1400. The display unit 1406 is a display system of the electronic device 1400, and is configured to present an interface, to implement human-computer interaction.

The display unit 1406 may include a display panel 14061. In an example embodiment, the display panel 14061 may be configured in a form of a liquid crystal display (LCD), an organic light-emitting diode (OLED), or the like.

Further, the touch panel 14051 may cover the display panel 14061. After detecting a touch operation on or near the touch panel, the touch panel 14051 transfers the touch operation to the processor 1403, to determine a type of a touch event. Then, the processor 1403 provides a corresponding visual output on the display panel 14061 according to the type of the touch event.

In FIG. 14, the touch panel 14051 and the display panel 14061 implement, as two independent parts, input and output functions of the electronic device 1400. However, in some embodiments, the touch panel 14051 and the display panel 14061 may be integrated to implement the input and output functions of the electronic device 1400.

The processor 1403 is a control center of the electronic device 1400, and connects various parts by using various interfaces and lines. By running or executing a software program and/or a module stored on the storage 1404, and invoking data stored in the storage 1404, the processor performs various functions of the electronic device 1400 and processes data, thereby implementing various services based on the electronic device, so that the processor 1403 performs the operations in the scene update control method described in the specification according to various exemplary embodiments of the disclosure.

In an example embodiment, the processor 1403 may include one or more processing units. In an example embodiment, the processor 1403 may integrate an application processor and a modem processor, where the application processor mainly processes an operating system, a user interface, an application program, and the like, and the modem processor mainly processes wireless communication. It may be understood that the foregoing modem may not be integrated into the processor 1403.

The audio output unit 1407 is connected to the processor 1403, and configured to output audio of the electronic device 1400.

The input unit 1408 includes a microphone 14081 for obtaining voice of a user, transmits the obtained voice to the processor 1403 for processing, and further includes an image processor 14082.

The camera 1411 is configured to implement a photographing function of the electronic device 1400, and photograph a picture or a video. The camera 1411 may also be configured to implement a scanning function of the electronic device 1400, and scan a scan object (a two-dimensional barcode/barcode).

The electronic device 1400 further includes the power supply 1402 (such as a battery) for supplying power to the components. In an example embodiment, the power supply 1402 may be logically connected to the processor 1403 by using a power management system, thereby implementing functions such as charging, discharging, and power consumption management by using the power management system.

Although not shown in the figure, the electronic device 1400 may further include at least one sensor and the like, and details are not described herein again.

In some example embodiments, the aspects of the scene update control method provided in the disclosure may be further implemented in a form of a program product, including program code. When the program product is run on a computer device, the program code is used for causing the computer device to perform the operations in the scene update control method according to various exemplary implementations of the disclosure.

The program product may use any combination of one or more readable media. The readable medium may be a computer-readable signal medium or a computer-readable storage medium. The readable storage medium may be, for example, but is not limited to, an electric, magnetic, optical, electromagnetic, infrared, or semi-conductive system, apparatus, or component, or any combination of the above. More specific examples of the readable storage medium (a non-exhaustive list) include: an electrical connection having one or more wires, a portable disk, a hard disk, a RAM, a ROM, an erasable programmable ROM (EPROM or a flash memory), an optical fiber, a compact disc ROM (CD-ROM), an optical storage device, a magnetic storage device, or any appropriate combination thereof.

The program product used for voxel file obtaining according to an implementation of the disclosure may be a CD-ROM, include program code, and may be run on the computing device. However, the program product of the disclosure is not limited to this. In this specification, the readable storage medium may be any tangible medium including or storing a program, and the program may be used by or in combination with an instruction execution system, apparatus, or device.

The readable signal medium may include a data signal propagated in a baseband or as part of a carrier, and stores computer-readable program code. A data signal propagated in such a way may assume a plurality of forms, including, but not limited to, an electromagnetic signal, an optical signal, or any appropriate combination thereof. The readable signal medium may alternatively be any readable medium other than the readable storage medium. The readable medium may be configured to transmit, propagate, or transmit a program used by or used in combination with an instruction execution system, an apparatus, or a device.

The program code included in the readable storage medium may be transmitted by using any suitable medium, including but not limited to a wireless medium, a wired medium, an optical cable, RF, or any appropriate combination thereof.

The program code used for executing the operations of the disclosure may be written by using one or more programming languages or a combination thereof. The programming languages include an object-oriented programming language such as Java, C++ and the like, and also include a conventional procedural programming language such as "C" or similar programming languages. The program code may be completely executed on a user computing device, partially executed on user equipment, executed as an independent software package, partially executed on a user computing device and partially executed on a remote computing device, or completely executed on a remote computing device or server. For the case involving a remote computing device, the remote computing device may be connected to a user computing device by any type of network including a LAN or a WAN, or may be connected to an external computing device (for example, through the Internet by using an Internet service provider).

Although several units or subunits of the apparatus are mentioned in detailed description above, such division is merely an example but not mandatory. According to some embodiments of the disclosure, features and functions of two or more units described above may be specified in one unit. On the other hand, according to other embodiments of the disclosure, the features or functions of one unit described above may further be divided and specified by a plurality of units.

In addition, although the operations of the method in the disclosure are described in a specific order in the accompanying drawings. This does not require or imply that the operations have to be performed in the specific order, or all the operations shown have to be performed to achieve an expected result. Additionally or alternatively, some operations may be omitted, and a plurality of operations are combined into one operation to be performed, and/or one operation is divided into a plurality of operations to be performed.

A person skilled in the art would understand that the embodiments of the disclosure may be provided as a method, a system, or a computer program product. Therefore, the disclosure may use a form of hardware-only embodiments, software-only embodiments, or embodiments combining software and hardware. Moreover, the disclosure may use a form of a computer program product that is implemented on one or more computer-usable storage media (including but not limited to a disk memory, a CD-ROM, an optical memory, and the like) that include computer-usable program code.

The disclosure is described with reference to flowcharts and/or block diagrams of the method, the device (system), and the computer program product according to the disclosure. It is to be understood that computer program instructions may implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may alternatively be stored in a computer-readable memory that may instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may also be loaded into a computer or another programmable data processing device, so that a series of operation operations are performed on the computer or another programmable data processing device to generate processing implemented by a computer, and instructions executed on the computer or another programmable data processing device provide operations for implementing functions specified in one or more procedures in the flowcharts and/or one or more blocks in the block diagrams.

Although preferable embodiments of the disclosure have been described, once persons skilled in the technology know a basic creative concept, they may make other changes and modifications to these embodiments. Therefore, the following claims are intended to be construed as to cover the exemplary embodiments and all changes and modifications falling within the scope of the disclosure.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

A person skilled in the art may make various modifications and variations to the disclosure without departing from the spirit and scope of the disclosure. Accordingly, the modifications and variations made to the disclosure fall within the scope of the following claims and their equivalents.

What is claimed is:

1. A scene update control method, performed by an electronic device, the method comprising:
    reading, in a process of updating a scene comprising a plurality of region blocks, voxel files of region blocks from a magnetic disk,
        wherein a plurality of voxel files of the plurality of region blocks are stored on the magnetic disk according to an order in which the plurality of region blocks in the scene are to be updated,
        wherein voxels on each region block form a voxel file; and
    in response to a memory pressure indicator being greater than or equal to a set threshold, storing the voxel files and index files into one of a user space of a memory or a cache space of the memory;
    determining, according to a region block to be updated in the scene, a target voxel file corresponding to the region block to be updated; and
    obtaining voxels in the target voxel file from the memory, and updating the scene according to the obtained voxels.

2. The method according to claim 1, wherein the reading the voxel files comprises
    reading the voxel files and the index files corresponding to the voxel files from the magnetic disk, and
    wherein the storing the voxel files and the index files comprises storing the voxel files and the index files that are read into the memory, and
    wherein each region block comprises a plurality of position coordinate pairs; an index file comprises indexes corresponding to the plurality of position coordinate pairs on a region block; an index corresponding to a position coordinate pair with voxels is an index corresponding to a starting voxel in all the voxels at the position coordinate pair; and the order of storing the index files on the magnetic disk is the same as an order of storing the voxel files on the magnetic disk.

3. The method according to claim 1, wherein the determining the target voxel file comprises:
    based on a current position coordinate pair of a target object in the scene, determining, as region blocks to be updated, a specified quantity of surrounding region blocks centered around a region block in which the current position coordinate pair is located; and
    determining voxel files corresponding to the specified quantity of surrounding region blocks as target voxel files.

4. The method according to claim 3, wherein the specified quantity of surrounding region blocks comprise N region blocks before the region block in which the current position coordinate pair is located and M region blocks after the region block in which the current position coordinate pair is located, M and N being integers.

5. The method according to claim 2, wherein the obtaining the voxels comprises:
    determining, for each position coordinate pair on a region block corresponding to the target voxel file, an index subscript corresponding to the each position coordinate pair and a quantity of voxels at the each position coordinate pair;
    determining, according to the index subscript, an index corresponding to a position coordinate pair with voxels in an index file corresponding to the target voxel file, and determining a starting voxel at position coordinate pairs in the target voxel file according to the index; and
    obtaining voxels at all position coordinate pairs from the memory according to the starting voxel and the quantity of voxels, and updating the scene according to the obtained voxels.

6. The method according to claim 1, wherein the storing the voxel files and the index files comprises:
    based on the memory pressure indicator being lower than a set upper limit threshold, and an occurrence of a page fault, storing the voxel files and the index files corresponding to the voxel files into the user space of the memory.

7. The method according to claim 1, wherein the storing the voxel files and the index files comprises:
    based on the memory pressure indicator being greater than or equal to a set upper limit threshold, and voxels in the target voxel file being missed in the cache space, storing the voxel files and the index files into the cache space of the memory.

8. The method according to claim 1, wherein the reading the voxel files and the storing the voxel files and the index files comprises:
based on the memory pressure indicator being lower than a set upper limit threshold, and an occurrence of a page fault occurs, calling an mmap function of an operating system;
reading, from the magnetic disk according to a size of each page in the operating system, voxel files corresponding to an integer number of region blocks that are centered around a region block in which a current position coordinate pair is located, and the index files corresponding to the voxel files; and
storing the voxel files and the index files into the user space of the memory.

9. The method according to claim 1, wherein the reading the voxel files and the storing the voxel files and the index files comprises:
based on the memory pressure indicator being greater than or equal to a set upper limit threshold, and voxels in the target voxel file being missed in a cache, reading voxel files of three consecutive region blocks centered around a region block in which a current position coordinate pair is located and the index files corresponding to the voxel files from the magnetic disk; and
storing the voxel files and the index files into the cache space of the memory.

10. An electronic device, comprising a storage and a processor, the storage being configured to store computer instructions executable by the processor to perform the scene update control method according to claim 1.

11. An apparatus for scene update control, the apparatus comprising:
at least one memory configured to store program code; and
at least one processor configured to read the program code and operate as instructed by the program code, the program code comprising:
reading code configured to cause at least one of the at least one processor to read, in a process of updating a scene comprising a plurality of region blocks, voxel files of region blocks from a magnetic disk,
wherein a plurality of voxel files of the plurality of region blocks are stored on the magnetic disk according to an order in which the plurality of region blocks in the scene are to be updated,
wherein voxels on each region block form a voxel file;
storing code configured to cause at least one of the at least one processor to, in response to a memory pressure indicator being greater than or equal to a set threshold, store the voxel files and index files into one of a user space of a memory or a cache space of the memory;
determining code configured to cause at least one of the at least one processor to determine, according to a region block to be updated in the scene, a target voxel file corresponding to the region block to be updated; and
update code configured to cause at least one of the at least one processor to obtain voxels in the target voxel file from the memory, and update the scene according to the obtained voxels.

12. The apparatus according to claim 11, wherein the reading code is further configured to cause the at least one of the at least one processor to
read the voxel files and the index files corresponding to the voxel files from the magnetic disk,
wherein the storing code is further configured to cause the at least one processor to store the voxel files and the index files that are read into the memory, and
wherein each region block comprises a plurality of position coordinate pairs; an index file comprises indexes corresponding to the plurality of position coordinate pairs on a region block; an index corresponding to a position coordinate pair with voxels is an index corresponding to a starting voxel in all the voxels at the position coordinate pair; and the order of storing the index files on the magnetic disk is the same as an order of storing the voxel files on the magnetic disk.

13. The apparatus according to claim 11, wherein the determining code is further configured to cause the at least one of the at least one processor to:
based on a current position coordinate pair of a target object in the scene, determining, as region blocks to be updated, a specified quantity of surrounding region blocks centered around a region block in which the current position coordinate pair is located; and
determine voxel files corresponding to the specified quantity of surrounding region blocks as target voxel files.

14. The apparatus according to claim 13, wherein the specified quantity of surrounding region blocks comprise N region blocks before the region block in which the current position coordinate pair is located and M region blocks after the region block in which the current position coordinate pair is located, M and N being integers.

15. The apparatus according to claim 12, wherein the update code is further configured to cause the at least one of the at least one processor to:
determine, for each position coordinate pair on a region block corresponding to the target voxel file, an index subscript corresponding to the each position coordinate pair and a quantity of voxels at the each position coordinate pair;
determine, according to the index subscript, an index corresponding to a position coordinate pair with voxels in an index file corresponding to the target voxel file, and determine a starting voxel at position coordinate pairs in the target voxel file according to the index; and
obtain voxels at all position coordinate pairs from the memory according to the starting voxel and the quantity of voxels, and update the scene according to the obtained voxels.

16. The apparatus according to claim 11, wherein the reading storing code is further configured to cause the at least one of the at least one processor to:
based on the memory pressure indicator being lower than a set upper limit threshold, and an occurrence of a page fault, store the voxel files and the index files into the user space of the memory.

17. The apparatus according to claim 11, wherein the storing code is further configured to cause be a least one of the at least one processor to:
based on the memory pressure indicator being greater than or equal to a set upper limit threshold, and voxels in the target voxel file being missed in the cache space, store the voxel files and the index files into the cache space of the memory.

18. The apparatus according to claim 11, wherein the storing code is further configured to cause the at least one of the at least one processor to:

based on the memory pressure indicator being lower than a set upper limit threshold, and an occurrence of a page fault, call an mmap function of an operating system;

read, from the magnetic disk according to a size of each page in the operating system, voxel files corresponding to an integer number of region blocks that are centered around a region block in which a current position coordinate pair is located, and the index files corresponding to the voxel files; and store the voxel files and the index files into the user space of the memory.

19. The apparatus according to claim 11, wherein the storing code is further configured to cause the at least one of the at least one processor to:

based on the memory pressure indicator being greater than or equal to a set upper limit threshold, and voxels in the target voxel file being missed in a cache, read voxel files of three consecutive region blocks centered around a region block in which a current position coordinate pair is located and the index files corresponding to the voxel files from the magnetic disk; and store the voxel files and the index files into the cache space of the memory.

20. A non-transitory computer-readable storage medium, storing computer instructions which, when executed by at least one processor causes the at least one processor to at least:

read, in a process of updating a scene comprising a plurality of region blocks, voxel files of region blocks from a magnetic disk,
 wherein a plurality of voxel files of the plurality of region blocks are stored on the magnetic disk according to an order in which the plurality of region blocks in the scene are to be updated,
 wherein voxels on each region block form a voxel file;

in response to a memory pressure indicator being greater than or equal to a set threshold, store the voxel files and index files into one of a user space of a memory or a cache space of the memory;

determine, according to a region block to be updated in the scene, a target voxel file corresponding to the region block to be updated; and obtain voxels in the target voxel file from the memory, and updating the scene according to the obtained voxels.

* * * * *